United States Patent
Edge

(10) Patent No.: US 9,357,439 B2
(45) Date of Patent: *May 31, 2016

(54) METHOD AND APPARATUS FOR MAINTAINING LOCATION CONTINUITY FOR A UE FOLLOWING HANDOVER

(71) Applicant: QUALCOMM Incorporated, San Diego, CA (US)

(72) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,262

(22) Filed: Jul. 30, 2015

(65) Prior Publication Data

US 2015/0341828 A1 Nov. 26, 2015

Related U.S. Application Data

(63) Continuation of application No. 12/702,069, filed on Feb. 8, 2010, now Pat. No. 9,307,454.

(60) Provisional application No. 61/151,123, filed on Feb. 9, 2009, provisional application No. 61/151,726, filed (Continued)

(51) Int. Cl.
*H04W 4/00* (2009.01)
*H04W 36/00* (2009.01)
(Continued)

(52) U.S. Cl.
CPC ............ *H04W 36/0005* (2013.01); *H04W 4/02* (2013.01); *H04W 36/385* (2013.01); *H04W 36/14* (2013.01); *H04W 76/007* (2013.01)

(58) Field of Classification Search
None
See application file for complete search history.

(56) References Cited

U.S. PATENT DOCUMENTS 5,570,411 A 10/1996 Sicher
6,424,638 B1 * 7/2002 Ray .................. H04W 36/0066
370/331

(Continued)

FOREIGN PATENT DOCUMENTS

CN 101132542 A 2/2008
JP 2004502387 A 1/2004

(Continued)

OTHER PUBLICATIONS

3GPP TS 23.401 V8.2.0, "3rd Generation Partnership Project, Technical Specification Group Services and System Aspects, General Packet Radio Service (GPRS) enhancements for Evolved Universal Terrestrial Radio Access Network (E-UTRAN) access", Release 8, Jun. 2008, 181 pages.

(Continued)

*Primary Examiner* — Kouroush Mohebbi
(74) *Attorney, Agent, or Firm* — Arnold J. Gum

(57) ABSTRACT

Techniques for maintaining location continuity for a user equipment (UE) following handover are described. The UE communicates with a first radio access network (RAN) and is served by a source serving node and a source location server prior to handover. The UE communicates with a second RAN and is served by a target serving node and a target location server after the handover. In an aspect, location continuity may be maintained for the UE by transferring an identity of the target serving node to a location server during handover of the UE. In one design, the target serving node sends its identity to the target location server, which updates a Location and Routing Function (LRF) serving the UE. In another design, for handover from packet-switched domain to circuit-switched domain, the source serving node sends the target serving node identity to the source location server, which updates the LRF.

34 Claims, 11 Drawing Sheets

Related U.S. Application Data on Feb. 11, 2009, provisional application No. 61/162,606, filed on Mar. 23, 2009, provisional application No. 61/163,664, filed on Mar. 26, 2009, provisional application No. 61/175,452, filed on May 4, 2009.

(51) Int. Cl.

| | |
|---|---|
| H04W 4/02 | (2009.01) |
| H04W 36/38 | (2009.01) |
| H04W 36/14 | (2009.01) |
| H04W 76/00 | (2009.01) |

(56) References Cited

U.S. PATENT DOCUMENTS

| | | | |
|---|---|---|---|
| 7,054,283 | B2 | 5/2006 | Carlsson et al. |
| 8,942,660 | B2 | 1/2015 | Edge et al. |
| 2001/0014604 | A1 | 8/2001 | Kingdon et al. |
| 2003/0035544 | A1 | 2/2003 | Herle et al. |
| 2006/0014517 | A1 | 1/2006 | Barclay et al. |
| 2006/0046714 | A1 | 3/2006 | Kalavade |
| 2006/0258352 | A1 | 11/2006 | Ishii |
| 2006/0293066 | A1 | 12/2006 | Edge et al. |
| 2007/0004378 | A1 | 1/2007 | Muhonen |
| 2007/0004429 | A1 | 1/2007 | Edge et al. |
| 2007/0060097 | A1 | 3/2007 | Edge et al. |
| 2007/0135089 | A1 | 6/2007 | Edge et al. |
| 2007/0171861 | A1 | 7/2007 | Akhtar |
| 2007/0207806 | A1 | 9/2007 | Shaheen |
| 2007/0254625 | A1* | 11/2007 | Edge .............. H04M 7/0078 455/404.1 |
| 2007/0287448 | A1 | 12/2007 | Kim et al. |
| 2008/0267153 | A1 | 10/2008 | Mukherjee et al. |
| 2010/0041418 | A1 | 2/2010 | Edge et al. |
| 2010/0202407 | A1 | 8/2010 | Edge |
| 2011/0165856 | A1 | 7/2011 | You et al. |

FOREIGN PATENT DOCUMENTS

| | | |
|---|---|---|
| JP | 2005521350 A | 7/2005 |
| KR | 20090003135 A | 1/2009 |
| WO | WO-0203718 A2 | 1/2002 |
| WO | WO-03081939 A1 | 10/2003 |
| WO | 2007002303 A1 | 1/2007 |
| WO | 2007016695 | 2/2007 |
| WO | 2007035736 A2 | 3/2007 |
| WO | 2008028402 A1 | 3/2008 |

OTHER PUBLICATIONS

3rd Generation Partnership Project; 1,6,8, Technical Specification Group Services and 13,15 System Aspects; Functional stage 2 description of Location Services (LCS) (Release 7), 3GPP Standard; 3GPP TS 23.271, 3rd Generation Partnership Project (3GPP), Mobile Competence Centre; 650, Route Des Luciolas; F-06921 Sophia-Antipolis Cedex; France, No. V7.9.0, Sep. 1, 2007, pp. 1-145, XP050363506, chapter 9.2.
3rd Generation Partnership Project, 22-36 Technical Specification Group Services and System Aspects, SR VCC Support for IMS Emergency Calls (Release 9), 3GPP TR 23.870, 3rd Generation Partnership Project (3GPP), Mobile Competence Centre, 650, Route Des Luciolas, F-06921 Sophia-Antipolis Cedex, France, No. V9.0.0, Jun. 1, 2009, pp. 1-14, XP050364047.
"3rd Generation Partnership Project; Technical Specification Group Services and System Aspects; Evaluation of LCS Control Plane Solutions for EPS (Release 9), "3GPP Standard; 3GPP TR 23.891, 3rd Generation Partnership Project (3GPP), Mobile Competence Centre; 650 Route Des Luciolas; F-06921 Sophia-Antipolis Cedex; France, No. V.0.3.0, Jan. 1, 2009, pp. 1-62, XP050380737, paragraphs [6.1.2.1], [6.1.3.1], paragraph [6.1.3.5], paragraph [6.1.3.5.3]-paragraph [6.1.3.6], paragraph [6.2.3.5].

Alcatel-Lucent, et al., "TR 23.891 Inter-MME Location Continuity" 3GPP Draft; S2-090682 R2 (WAS 0071) E-UTRAN Location Continuity, 3rd Generation Partnership Project (3GPP), Mobile Competence Centre; 650, Route Des Luciolas; F-06921 Sophia-Antipolis Cedex; France, no. Phoenix; Jan. 16, 2009, XP050333147 [retrieved on Jan. 16, 2009] the whole document.
Huawei: "Location service support by E-UTRAN" Jun. 23, 2009, 3GPP Draft; R2-093906 Location Service Support by E-UTRAN, 3rd Generation Partnership Project (3GPP), Mobile Competence Centre; 650, Route Des Luciolas; F-06921 Sophia-Antipolis Cedex; France, XP050352101 [retrieved on Jun. 23, 2009] the whole document.
International Search Report & Written Opinion—PCT/US2010/023670, International Search Authority—European Patent Office—Nov. 5, 2010.
ITU-R AD HOC: "Proposed update of Section 5.3.1 toward Rev8 of M.1457", TSG-RAN Meeting #38, RP-070965, Nov. 27, 2007, pp. 1-34.
Nokia Siemens Networks et al., "Location Continuity in SRVCC", 3GPP Draft, S2-091157 S2 71_SRVCC.LCS.V02, 3rd Generation Partnership Project (3GPP), Mobile Competence Centre, 650, Route Des Luciolas, F-06921 Sophia-Antipolis Cedex, France, no. Budapest, Feb. 10, 2009, XP050333559.
Nokia Siemens Networks et al: "SRVCC functionality for emergency calls" 3GPP Draft; S2-093438—Merged of Agreed 23 216 CRs in S2-092792 and S2-092793, 3rd Generation Partnership Project (3GPP), Mobile Competence Centre; 650, Route Des Luciolas; F-06921 Sophia-Antipolis Cedex France, no. Tallinn; May 5, 2009, XP050346518.
Nokia Siemens Networks, et al., "SRVCC functionality for emergency calls," S2-093756, 3GPP TSG-SA2 Meeting #73, May 15, 2009.
QUALCOM Europe: "LCS Control Plan Alternatives for EPS, TD S2-085599, 3gpp TSG SA WG2 Meeting #67" 3GPP WG2, [Online]—Aug. 19, 2008 XP002557776 Internet Publication Retrieved from the Internet: URL: http://www.3gpp.org/ftp/tsg-sa/WG2-Arch/TSGS2_67_Sophia-Antipolis/Docs/> [retrieved on Nov. 26, 2009] the whole document.
QUALCOMM Europe et al., "Details on Architectural Alternative #2 for LCS Control Plane Solutions for EPS", 3GPP Draft; S2-088298_e-mail-rev1-S2-088148_(LCS CP solution for EPS—architecture alternative #2), 20081129 3rd Generation Partnership Project (3GPP), Mobile Competence Centre; 650, route des Luciolas; F-06921 Sophia-Antipolis Cedex; France, vol. SA WG2, Miami; 20081117-20081121 Nov. 29, 2008 XP050629278 [retrieved on Nov. 29, 2008], 9 pages.
QUALCOMM Europe (for RAN2): "LS on 10 Architecture and work split for positioning in LTE", 3GPP Draft; R2-094074, 3rd Generation Partnership Project (3gpp), Mobile Competence Centre; 650, Route Des Luciolas; F-06921 Sophia-Antipolis Cedex; France, no. Los Angeles, USA; Jul. 3, 2009, XP050352219, [retrieved on Jul. 3, 2009] 1 page.
QUALCOMM Europe: "LCS Control Plane Alternatives for EPS", 3GPP Draft; S2-085599 (LCS Control Plane Solution for EPS), 3rd Generation Partnership Project (3GPP), Mobile Competence Centre ; 650, Route Des Luciolas; F-06921 Sophia-Antipolis Cedex; France, vol. SA WG2, no. Sophia Antipolis, France; 20080825-20080829, Aug. 19, 2008, XP050628859, [retrieved on Aug. 19, 2008] * chapter 1.1 chapters 10.2, 10.3 figures 22, 23.
QUALCOMM Europe: "Location Continuity for Handoff of Emergency Calls", S2-091450, 3GPP, Feb. 16, 2009.
QUALCOMM Europe: "Location Continuity for SRVCC support of Emergency Calls," S2-091451, 3GPP TSG SA WG2 Meeting #71, Feb. 20, 2009.
QUALCOMM Europe: "SRVCC functionality for emergency calls" 3GPP Draft; S2-093755 (Rev of S2-093574-S2-092792), 3rd Generation Partnership Project (3GPP), Mobile Competence Centre; 650, Route Des Luciolas; F-06921 Sophia-Antipolis Cedex France, no. Tallinn; May 14, 2009, XP050346787.
Taiwan Search Report—TW099104029—TIPO—Sep. 19, 2013.

* cited by examiner

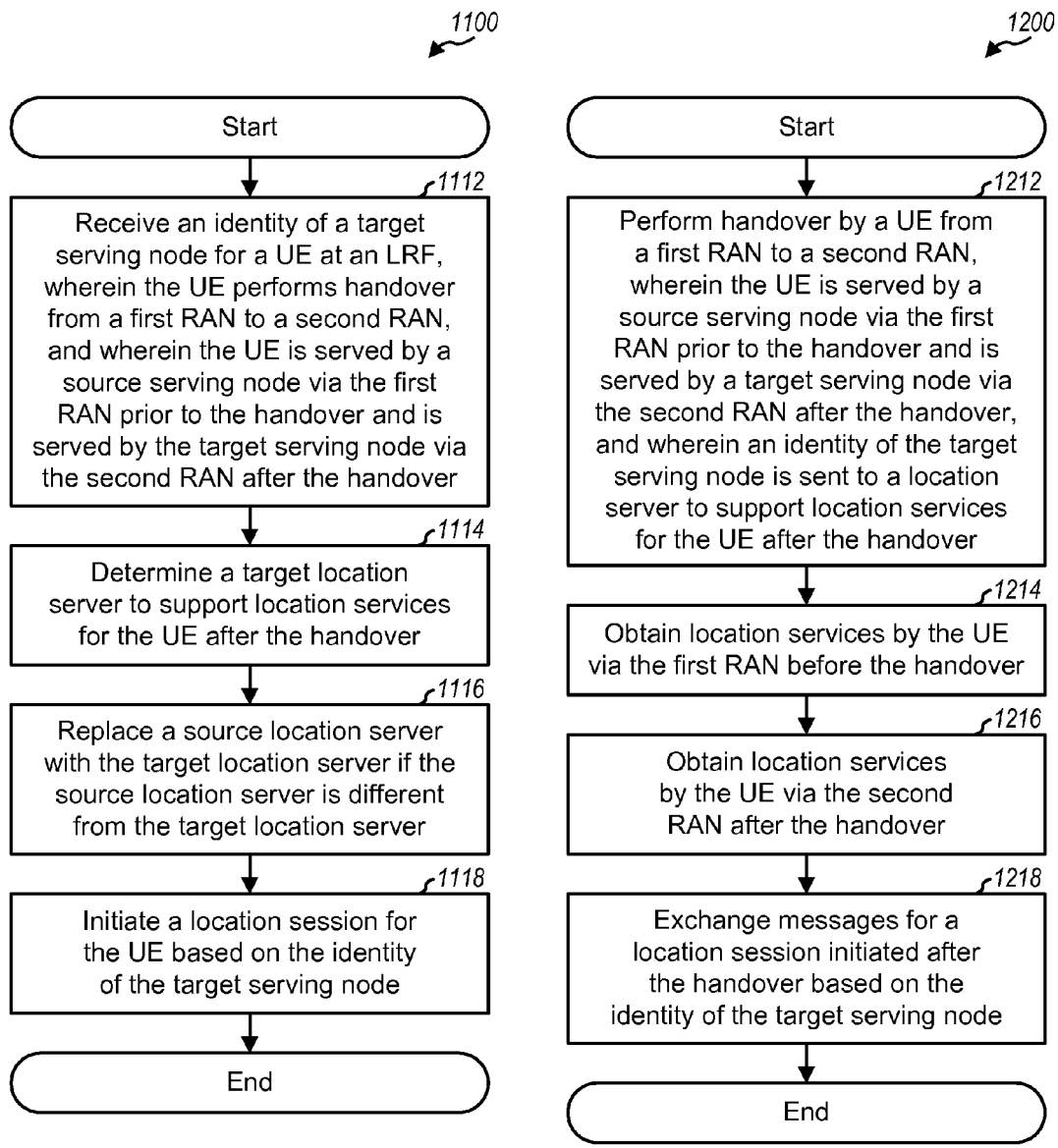

METHOD AND APPARATUS FOR MAINTAINING LOCATION CONTINUITY FOR A UE FOLLOWING HANDOVER

CROSS-REFERENCE TO RELATED APPLICATIONS

This application is a continuation of U.S. application Ser. No. 12/702,069, entitled "METHOD AND APPARATUS FOR MAINTAINING LOCATION CONTINUITY FOR A UE FOLLOWING HANDOVER," filed Feb. 8, 2010, which claims the benefit of U.S. Provisional Application Ser. No. 61/151,123, entitled "Location Continuity for Emergency Calls," filed Feb. 9, 2009, U.S. Provisional Application Ser. No. 61/151,726, entitled "Location Continuity for Emergency Calls," filed Feb. 11, 2009, U.S. Provisional Application Ser. No. 61/162,606, entitled "Location Continuity for Emergency Calls," filed Mar. 23, 2009, U.S. Provisional Application Ser. No. 61/163,664, entitled "Location Continuity for Emergency Calls," filed Mar. 26, 2009, and U.S. Provisional Application Ser. No. 61/175,452, entitled "Location Continuity for Emergency Calls," filed May 4, 2009, each of which is assigned to the assignee hereof and expressly incorporated herein by reference.

BACKGROUND

I. Field

The present disclosure relates generally to communication, and more specifically to techniques for supporting location services for user equipments (UEs).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A UE may communicate with a wireless network for a call, e.g., an emergency call. It may be desirable to determine the location of the UE during the call, e.g., so that emergency personnel can be dispatched to the proper location. The location of the UE may be determined with support from one or more network entities that can provide location services for the UE. The UE may be mobile and may be handed over from one wireless network to another wireless network during the call. It may be desirable to maintain location services for the UE after handover.

SUMMARY

Techniques for maintaining location continuity for a UE following handover are described herein. Location continuity refers to the ability to continue to support location services for the UE after handover from one wireless network to another wireless network. Location continuity may be especially desirable for an emergency call, for example, so that an initial location estimate and/or updated location estimates for the UE can be provided to a Public Safety Answering Point (PSAP) servicing the emergency call.

The UE may be handed over from a first radio access network (RAN) to a second RAN during a call. The UE may communicate with the first RAN and may be served by a source serving node and a source location server prior to handover. The UE may communicate with the second RAN and may be served by a target serving node and a target location server after handover. Each RAN may support radio communication for the UE. Each serving node may support communication services for the UE. Each location server may support location services for the UE.

In an aspect, location continuity may be maintained for the UE by transferring an identity or address of the target serving node to a location server during handover of the UE. In one design, the target serving node may send its identity to the target location server, which may then update a Location and Routing Function (LRF) serving the UE. In another design, which may be applicable for handover from packet-switched domain to circuit-switched domain, the source serving node may send the identity of the target serving node to the source location server, which may then update the LRF. For both designs, the LRF may use the target serving node identity to initiate a location session for the UE, if needed. The LRF may remove the source location server after the handover if it is different from the target location server.

Various aspects and features of the disclosure are described in further detail below.

BRIEF DESCRIPTION OF THE DRAWINGS

FIG. 11 illustrates a process for supporting location services by a LRF.

FIG. 12 illustrates a process for obtaining location services by a UE.

DETAILED DESCRIPTION

Techniques for maintaining location continuity for a UE following handover are described herein. The techniques may be used for various wireless networks such as 3GPP wireless networks defined by an organization named "3rd Generation Partnership Project" (3GPP) and 3GPP2 wireless networks defined by an organization named "3rd Generation Partnership Project 2" (3GPP2).

The techniques may also be used for different types of calls such as circuit-switched (CS) calls and packet-switched (PS) calls. A CS call is a call in which dedicated resources (e.g., traffic channels) are assigned for the call for its entire duration. A PS call is a call in which data is sent in packets using shared resources. A wireless network may support only CS calls, or only PS calls, or both CS and PS calls.

The techniques may also be used for user plane and control plane location solutions/architectures. A user plane location solution is a location solution that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of data (from a network perspective) in a user plane location solution. The content of the messages may, however, be the same or similar in both user plane and control plane location solutions.

Table 1 lists some exemplary location solutions. Secure User Plane Location (SUPL) is described in documents publicly available from Open Mobile Alliance (OMA). TS 23.271 and other "TS" documents are publicly available from 3GPP. ANSI J-STD-036 is described in documents publicly available from American National Standards Institute (ANSI). 3GPP2 X.S0002 is described in documents publicly available from 3GPP2.

TABLE 1

Location Solutions

| Location Solution | Location Solution Type | Applicable for |
| --- | --- | --- |
| SUPL | User Plane | 3GPP and 3GPP2 networks |
| TS 23.271 | Control Plane | 3GPP networks |
| ANSI J-STD-036 and 3GPP2 X.S0002 (TIA IS-881) | Control Plane | 3GPP2 networks |

Figure 1:
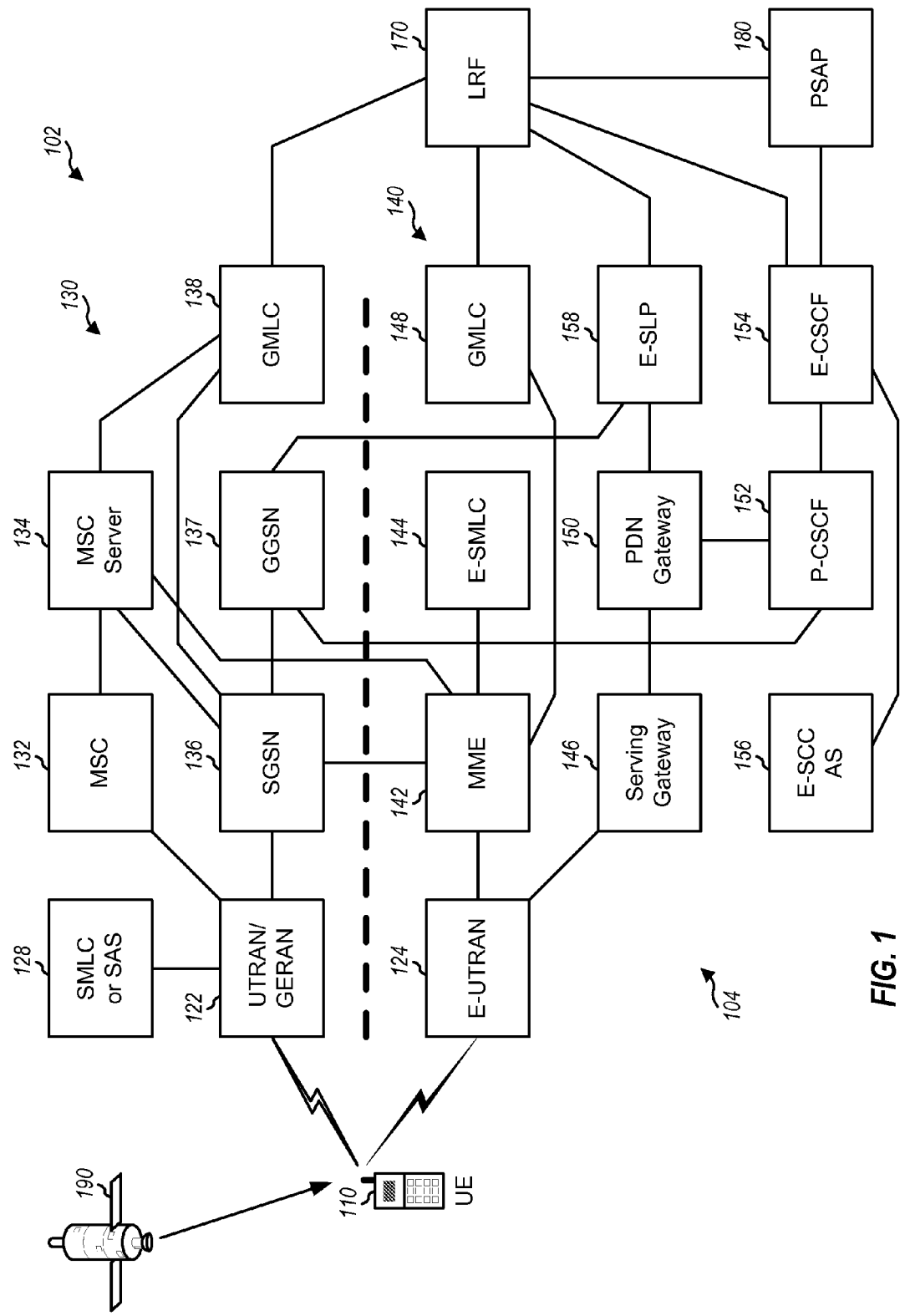
FIGS. 1 and 2 illustrate two exemplary deployments of different wireless networks.

FIG. 1 shows an exemplary deployment of 3GPP wireless networks 102 and 104. In general, a wireless network may include (i) a RAN that can support radio communication and (ii) a core network that can support various communication services. A RAN may also be referred to as an access network, a radio network, etc. Wireless network 102 includes a RAN 122 and a core network 130. Wireless network 104 includes a RAN 124 and a core network 140.

RAN 122 may be a Universal Terrestrial Radio Access Network (UTRAN) that supports Wideband Code Division Multiple Access (WCDMA), or a GSM EDGE Radio Access Network (GERAN) that supports Global System for Mobile Communications (GSM) and Enhanced Data rates for GSM Evolution (EDGE), or a RAN that supports some other radio access technology (RAT). RAN 124 may be an Evolved UTRAN (E-UTRAN) that supports Long Term Evolution (LTE) or a RAN that supports some other RAT. RAT may also be referred to as radio technology, air-link interface, wireless access type, etc. Each RAN may include base stations and/or other network entities. A base station may also be referred to as a Node B, an evolved Node B (eNB), etc. For example, UTRAN 122 may include Node Bs and Radio Network Controllers (RNCs), which may provide coordination and control of the Node Bs. E-UTRAN 124 may include eNBs.

Core network 130 may support various communication services for UEs communicating with RAN 122. Within core network 130, a Mobile Switching Center (MSC) 132 may perform switching and signaling functions for CS calls for UEs within its coverage area. An MSC server 134 may perform signaling functions for CS calls for UEs within its coverage area. A Serving GPRS Support Node (SGSN) 136 may perform signaling, switching and routing functions for PS connections and sessions for UEs communicating with RAN 122. A Gateway GPRS Support Node (GGSN) 137 may perform various functions such as maintenance of data connectivity for UEs, IP address allocation, IP routing, etc. A Serving Mobile Location Center (SMLC) or a Standalone SMLC (SAS) 128 may support positioning for UEs communicating with RAN 122. Positioning refers to a functionality that determines a geographical location of a target UE. A Gateway Mobile Location Center (GMLC) 138 may perform various functions to support location services, interface with external location services (LCS) clients, and provide services such as subscriber privacy, authorization, authentication, billing, etc. SMLC/SAS 128 and GMLC 138 may support a control plane location solution for 3GPP, e.g., TS 23.271.

Wireless network 102 may support PS and CS calls. For UTRAN PS, a PS call may be supported by UTRAN 122 and SGSN 136. For UTRAN CS, a CS call may be supported by UTRAN 122 and either MSC 132 or MSC server 134. For GERAN CS, a CS call may be supported by GERAN 122 and either MSC 132 or MSC server 134.

Core network 140 may support various communication services for UEs communicating with RAN 124. Within core network 140, a Mobility Management Entity (MME) 142 may perform various control functions such as mobility management, gateway selection, authentication, bearer management, etc. An Evolved SMLC (E-SMLC) 144 may support positioning for UEs communicating with RAN 124. A serving gateway (S-GW) 146 may perform various functions related to data transfer for UEs such as data routing and forwarding, mobility anchoring, etc. A Packet Data Network (PDN) gateway 150 may perform various functions such as maintenance of data connectivity for UEs, IP address allocation, IP routing, etc.

A GMLC 148 may support location services for UEs communicating with RAN 124. An Emergency SUPL Location Platform (E-SLP) 158 may include a SUPL Location Center (SLC) and possibly a SUPL Positioning Center (SPC). The SLC may perform various functions for location services, coordinate the operation of SUPL, and interact with SUPL enabled terminals (SETs). The SPC may support positioning for SETs and delivery of assistance data to the SETs and may also be responsible for messages and procedures used for position calculation. GMLC 148 may support a control plane location solution for 3GPP, e.g., TS 23.271. E-SLP 158 may support SUPL. Either the control plane or the user plane location solution may be selected for a given call via RAN 124 or via RAN 122 and SGSN 136.

A Proxy Call Session Control Function (P-CSCF) 152 and an Emergency CSCF (E-CSCF) 154 may support IP Multimedia Subsystem (IMS) services, e.g., Voice-over-IP (VoIP). P-CSCF 152 may accept requests from UEs and may service these requests internally or forward them to other entities, possibly after translation. E-CSCF 154 may perform session control services for UEs, may maintain session state used to support IMS emergency services, and may support emergency VoIP calls. An Emergency Service Centralization and Continuity Application Server (E-SCC AS) 156 may support single radio voice call continuity (SRVCC) for voice calls. With SRVCC, a call can be preserved when handover occurs between a CS RAN and a PS RAN for a UE that cannot access both RANs simultaneously.

A PSAP 180 is an entity responsible for answering emergency calls (e.g., for police, fire, and medical services) and may also be referred to as an Emergency Center (EC). Such a call may be initiated when a user dials some fixed well-known number such as '911' in North America or '112' in Europe. PSAP 180 may support PS calls (e.g., VoIP calls) and Session Initiation Protocol (SIP), which is a signaling protocol for initiating, modifying, and terminating interactive user sessions based on IP. PSAP 180 may also support CS calls.

A LRF 170 may interface with PSAP 180 and may perform routing functions and support location services (e.g., retrieval of location estimates) for emergency calls. LRF 170 may be assigned when an emergency call is originated in the PS domain, as described in TS 23.167. LRF 170 may be an anchor point for location services and may be maintained after handover. LRF 170 may be implemented external to any location server, as shown in FIG. 1. LRF 170 may also overlap with a location server, e.g., via a connection or via a common physical implementation.

A UE 110 may communicate with wireless network 102 and/or 104 to obtain communication services. UE 110 may be stationary or mobile and may also be referred to as a mobile station, an access terminal, a SET, a subscriber unit, a station, etc. UE 110 may be a cellular phone, a personal digital assistant (PDA), a wireless device, a wireless modem, a wireless router, a laptop computer, a telemetry device, a tracking device, etc. UE 110 may communicate with one or more base stations in RAN 122 or 124. UE 110 may also receive and measure signals from one or more satellites 190 and obtain pseudo-range measurements for the satellites. UE 110 may also measure signals from base stations in RAN 122 and/or RAN 124 and obtain timing measurements, signal strength measurements, and/or signal quality measurements for the base stations. The pseudo-range measurements, timing measurements, signal strength measurements, and/or signal quality measurements may be used to derive a location estimate for UE 110. A location estimate may also be referred to as a position estimate, a position fix, etc.

Satellites 190 may be part of the United States Global Positioning System (GPS), the European Galileo system, the Russian GLONASS system, or some other Satellite Positioning System (SPS). A SPS typically includes a system of transmitters positioned to enable receivers to determine their location on or above the Earth based on signals received from the transmitters.

Figure 2:
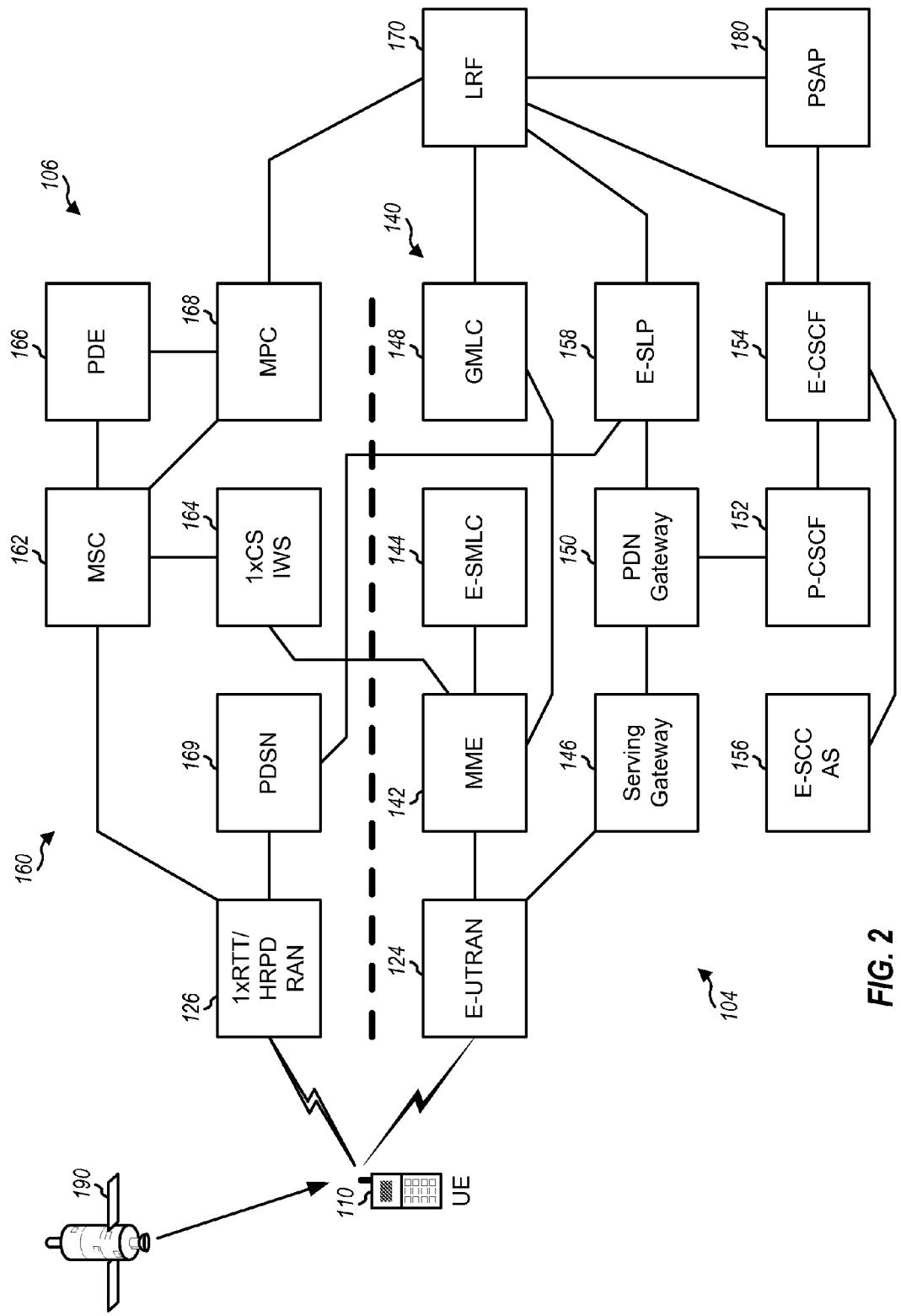

FIG. 2 shows an exemplary deployment of 3GPP wireless network 104 and a 3GPP2 wireless network 106. Wireless network 106 includes a RAN 126 and a core network 160. RAN 126 may be a 1xRTT RAN that supports CDMA2000 1xRTT, or a High Rate Packet Data (HRPD) RAN that supports IS-858, or a RAN that supports some other RAT. 1xRTT and HRPD are part of cdma2000. HRPD is also referred to as Evolution-Data Optimized (EV-DO).

Core network 160 may support various communication services for UEs communicating with RAN 126. Within core network 160, a 1xRTT MSC 162 may perform switching functions for CS calls for UEs communicating with 1xRTT RAN 126. A 1xCS Interworking Solution Function (1xCS IWS) 164 may support interworking between core networks 140 and 160. A Packet Data Serving Node (PDSN) 169 may perform switching and routing functions for PS connections and sessions for UEs communicating with HRPD RAN 126. A Position Determining Entity (PDE) 166 may support positioning for UEs communicating with 1xRTT/HRPD RAN 126. A Mobile Positioning Center (MPC) 168 may perform various functions to support location services, interface with external LCS clients, and provide services such as subscriber privacy, authorization, authentication, billing, etc. MPC 168 may support a control plane location solution for 3GPP2, e.g., ANSI J-STD-036, 3GPP2 X.S0002, etc.

FIGS. 1 and 2 show some network entities that may be included in each wireless network. FIGS. 1 and 2 also show some interface between the various network entities. Each wireless network may include other network entities and interfaces that can support other functions and services.

UE 110 may communicate with a wireless network for a call, e.g., an emergency call. UE 110 may have a serving node designated to serve UE 110 for communication services. The serving node may be dependent on which RAN UE 110 is communicating with and the type of call. Table 2 lists different network entities that may act as the serving node for UE 110. PDSN 169 may be different from the other serving nodes in that it does not communicate directly with a location server such as an MPC.

TABLE 2

Serving Nodes

| Serving Node | Scenario |
|---|---|
| MME | UE communicates with E-UTRAN for PS call. |
| SGSN | UE communicates with UTRAN for PS call. |
| MSC Server | UE communicates with UTRAN for CS call. |
| MSC or MSC Server | UE communicates with GERAN for CS call. |
| MSC | UE communicates with 1xRTT RAN for CS call. |
| PDSN | UE communicates with HRPD RAN for PS call. |

UE 110 may receive location services via a location server during a call. The location server may be dependent on which wireless network UE 110 is communicating with and whether a control plane or a user plane location solution is utilized. Table 3 lists different network entities that may act as the location server for UE 110.

TABLE 3

Location Servers

| Location Server | Scenario |
|---|---|
| GMLC | For control plane location solution in 3GPP network. |
| MPC | For control plane location solution in 3GPP2 network. |
| E-SLP | For user plane location solution in 3GPP and 3GPP2 networks. |

UE 110 may perform handover during a call. Handover refers to transfer of a radio connection for a UE from one RAN to another RAN. The radio connection may be used to support signaling and traffic data between the UE and the RAN. Traffic data may comprise one or more of a voice call, an emergency call, a data call, etc. Depending on the RAT, a voice call or an emergency call may use either a circuit or VoIP, for example.

UE 110 may perform handover from a source wireless network to a target wireless network during a call. UE 110 may communicate with a source RAN and may be served by a source serving node and a source location server in the source wireless network prior to handover. UE 110 may communicate with a target RAN and may be served by a target serving node and a target location server in the target wireless network after handover. The network entities prior to handover are in the source side, and the network entities after handover are in the target side. If the call is an emergency call serviced by PSAP 180, then the source and target location servers may interact with a common LRF 170 that may provide an interface to PSAP 180.

The source and target RANs may each utilize any RAT and may support CS or PS calls. The source and target location servers may each support control plane or user plane location solution. There may be a large number of possible handover scenarios with the following choices of source and target RANs and source and target location solutions:

Source RAN: E-UTRAN, UTRAN PS, UTRAN CS, GERAN PS, GERAN CS, 1×RTT, HRPD,

Target RAN: E-UTRAN, UTRAN PS, UTRAN CS, GERAN PS, GERAN CS, 1×RTT, HRPD,

Source Location Solution: 3GPP CP solution for GERAN, UTRAN, and E-UTRAN; 3GPP2 CP solution for 1×RTT; SUPL, and Target Location Solution: 3GPP CP solution for GERAN, UTRAN, and E-UTRAN; 3GPP2 CP solution for 1×RTT; SUPL.

Table 4 lists some exemplary handover scenarios (in the top row) and provides the source and target RANs, the source and target serving nodes, and the source and target location servers for each handover scenario.

TABLE 4

Handover Scenarios

| | E-UTRAN to UTRAN PS | E-UTRAN to GERAN CS | E-UTRAN to 1×RTT |
|---|---|---|---|
| Source RAN | E-UTRAN 124 | E-UTRAN 124 | E-UTRAN 124 |
| Target RAN | UTRAN 122 | GERAN 122 | 1×RTT RAN 126 |
| Source Serving Node | MME 142 | MME 142 | MME 142 |
| Target Serving Node | SGSN 136 | MSC Server 134 | MSC 162 |
| Source Location Server | GMLC 148 or E-SLP 158 | GMLC 148 or E-SLP 158 | GMLC 148 or E-SLP 158 |
| Target Location Server | GMLC 138 or E-SLP 158 | GMLC 138 | MPC 168 |

It may be desirable to maintain location continuity for UE 110 for as many handover scenarios as possible. The following set of actions may be performed in order to maintain location continuity for UE 110 following handover:

(a) Removal of a source location server (e.g., GMLC, MPC, or E-SLP) if different from a target location server;

(b) Assignment of the target location server (e.g., GMLC, MPC, or E-SLP) if different from the source location server;

(c) If control plane location solution is supported by the target location server, provision of the target location server with an identity of the target serving node (e.g., MME, SGSN, MSC server, or 1×RTT MSC) and possibly a target cell identity (ID); and (d) If SUPL is supported by the target location server but not by the source location server, provision of the E-SLP with (i) means to access UE 110, e.g., means to support UDP/IP or SIP Push transfer of a SUPL INIT message from the E-SLP to the UE and (ii) possibly means to support mutual authentication.

The target serving node identity may be an IP address, or an E.164 address, or a Fully Qualified Domain Name (FQDN), or a Diameter Identity. Action (c) may enable the location of UE 110 to be obtained (e.g., on behalf of PSAP 180) using a Mobile Terminated Location Request (MT-LR) location procedure for control plane after handover. Action (d) may enable the location of UE 110 to be obtained (e.g., on behalf of PSAP 180) using a SUPL location procedure after handover. These location procedures may be used to obtain initial and/or updated location estimates for UE 110 for an emergency call.

Various schemes may be defined to maintain location continuity for UE 110 by completing actions (a) to (d). These schemes may assume a single LRF 170 but potentially multiple location servers to support emergency calls, which may originate in or may be handed over to the PS domain. These schemes may be used for handover from wireless network 104 to wireless network 102 (or vice versa) in FIG. 1 and also from wireless network 104 to wireless network 106 (or vice versa) in FIG. 2.

Figure 3:
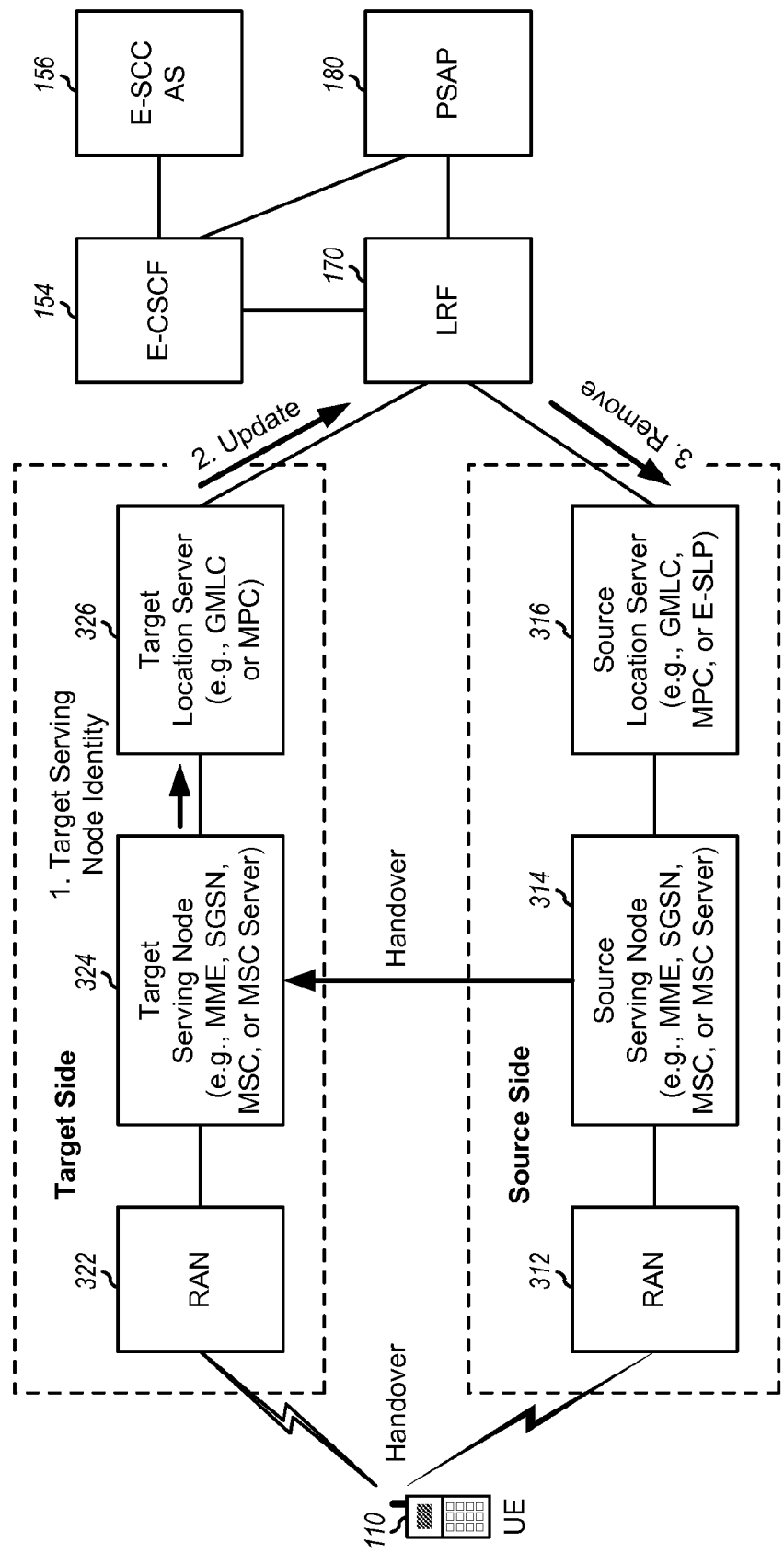
FIGS. 3 through 6 illustrate four schemes for maintaining location continuity for a UE.

FIG. 3 shows a design of a first scheme for maintaining location continuity for UE 110 following handover, e.g., of an emergency call. The first scheme may be used for handover scenarios in which (i) a control plane or a user plane location solution is used on the source side and (ii) a control plane solution is used on the target side. As shown in FIG. 3, UE 110 may communicate with a first RAN 312 and may be served by a source serving node 314 and a source location server 316 on the source side prior to handover. UE 110 may communicate with a second RAN 322 and may be served by a target serving node 324 and a target location server 326 on the target side after handover. Source serving node 314 may be MME 142, or SGSN 136, or MSC server 134, or 1×RTT MSC 162 in FIGS. 1 and 2. Target serving node 324 may be MME 142, or SGSN 136, or MSC server 134, or 1×RTT MSC 162. Source location server 316 may be (i) GMLC 138, or GMLC 148, or MPC 168 for control plane location solution or (ii) E-SLP 158 for user plane location solution. Target location server 326 may be GMLC 138, or GMLC 148, or MPC 168 for control plane location solution.

UE 110 may perform handover from RAN 312 to RAN 322. Source serving node 314 may also perform handover for UE 110 with target serving node 324. A base station or some other network entity (e.g., an RNC) in RAN 312 may provide source serving node 314 with an identity of either (i) a target base station or a target RNC for handover to UTRAN or E-UTRAN or (ii) a target cell/sector for handover to GERAN or 1×RTT. This identity may be derived from handover related measurements provided by UE 110 to the source base station. Source serving node 314 may use its configuration information to convert the received base station or cell identity to the identity of target serving node 324, which may be a serving node for the identified target base station or target cell/sector.

For the first scheme, target serving node 324 may determine target location server 326, e.g., based on configuration information stored at target serving node 324 or a Domain Name System (DNS) query. The determination may take into account the target base station or target cell/sector, e.g., in order that different location servers may be assigned to support different sets of base stations or cell/sectors associated with the same serving node. Target serving node 324 may transfer its identity (e.g., its address) to target location server 326 during handover or when handover is complete (step 1). The transfer may be achieved with (i) a Mobile Application Part (MAP) Subscriber Location Report (SLR) message if target serving node 324 is SGSN 136 or MSC server 134, or (ii) an ANSI-41 Origination Request (ORREQ) message if target serving node 324 is 1×RTT MSC 162, or (iii) an SLR or some other message if target serving node 324 is MME 142. Target serving node 324 may normally interact with target location server 326 to support location services. The transfer in step 1 may be achieved using the existing interface between target serving node 324 and target location server 326.

Target location server 326 may determine whether it is the source location server for UE 110, e.g., by looking for a call record for UE 110 if call records are maintained. If the target and source location servers are determined to be the same, then the remaining steps may be skipped. Otherwise, target location server 326 may update LRF 170 with information on the handover (step 2). For example, target location server 326 may provide the identity of target serving node 324 and the identity of UE 110 to LRF 170. LRF 170 may receive the update from target location server 326 and may remove source location server 316 if it is currently assigned and different from target location server 326 (step 3).

As an alternative, if target serving node 324 is 1xRTT MSC 162, then UE 110 and 1xCS IWS 164 may originate a 1xRTT emergency call from the perspective of 1xRTT MSC 162 as part of handover, e.g., similar to origination of a normal call for handover according to TS 23.216. This may then cause 1xRTT MSC 162 to query MPC 168 as part of normal 1xRTT emergency call origination. MPC 168 then may return (i) an Emergency Services Routing Key (ESRK) number that identifies a cell/sector of call origination or (ii) an Emergency Services Routing Digit (ESRD) number that uniquely identifies the call in a given cell/sector. However, MPC 168 may determine that the query from 1xRTT MSC 162 is to support handover to 1xRTT of an emergency call for UE 110, e.g., MPC 168 may query LRF 170 to determine that a record for an emergency call for UE 110 already exists in LRF 170. MPC 168 may then set the ESRK or ESRD number to an Emergency Session Transfer Number for SRVCC (E-STN-SR). As part of normal emergency call setup according to J-STD-036, 1xRTT MSC 162 may then route the call to the E-STN-SR, which may then transfer the call to E-SCC AS 156.

The first scheme may be robust in dealing with consecutive handovers because the target serving node controls both the updating of the location servers in step 1 and the subsequent handover. If step 1 is acknowledged by the target location server at the same time as (or after) step 2, then the target serving node may wait until this acknowledgment is received before instigating another handover of UE 110 if another handover is needed after step 1 but before the acknowledgment is received. This may ensure that LRF 170 will be notified of the first handover (in step 2) before it is possibly notified later of the second handover, e.g., the handover notifications to LRF 170 will not occur in the wrong order. If another handover is needed before step 1 occurs, then the target serving node may skip steps 1 to 3 and may allow the new target serving node to perform the update, which may hide the first handover from the location servers and LRF 170 and may make it appears as if only the subsequent handover had occurred.

Figure 4:
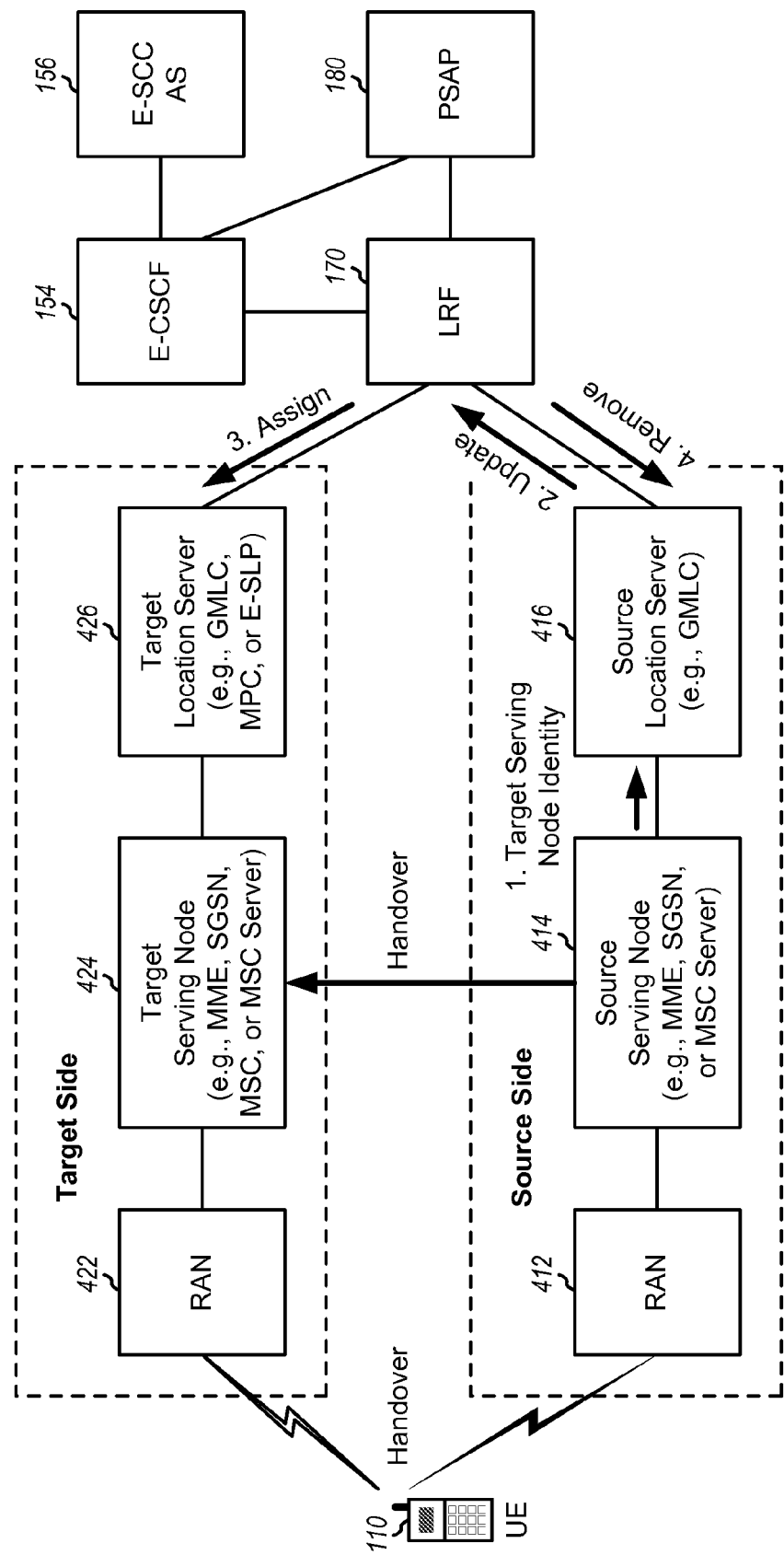

FIG. 4 shows a design of a second scheme for maintaining location continuity for UE 110 following handover, e.g., of an emergency call. The second scheme may be used for handover scenarios in which (i) a control plane location solution is used on the source side and (ii) a control plane or a user plane solution is used on the target side. As shown in FIG. 4, UE 110 may communicate with a first RAN 412 and may be served by a source serving node 414 and a source location server 416 prior to handover. UE 110 may communicate with a second RAN 422 and may be served by a target serving node 424 and a target location server 426 after handover. Source serving node 414 may be MME 142, or SGSN 136, or MSC server 134. Target serving node 424 may be MME 142, or SGSN 136, or MSC server 134, or 1xRTT MSC 162. Source location server 416 may be GMLC 138 or GMLC 148 for control plane location solution. Target location server 426 may be (i) GMLC 138, or GMLC 148, or MPC 168 for control plane location solution or (ii) E-SLP 158 for user plane location solution.

For the second scheme, source serving node 414 may transfer the identity of UE 110 and the identity of target serving node 424 to source location server 416 after handover is complete (step 1). This transfer may be achieved with (i) a MAP Subscriber Location Report (SLR) message if source serving node 414 is SGSN 136 or MSC server 134 or (ii) an SLR or equivalent message if source serving node 414 is MME 142.

If source location server 416 maintains call records and can determine that it will be the target location server, then the subsequent steps may be skipped. Otherwise, source location server 416 may update LRF 170 with information on the handover, e.g., provide the UE identity and the target serving node identity (step 2). LRF 170 may determine and assign target location server 426 for UE 110. If target location server 426 is different from source location server 416, then LRF 170 may provide target location server 426 with information about UE 110 and target serving node 424 (step 3). LRF 170 may then remove source location server 416 if it is different from target location server 426 (step 4). Target location server 426 may communicate with target serving node 424 based on the information received from LRF 170. Target serving node 424 may determine target location server 426 (e.g., based on configuration information) if a subsequent handover from the target side occurs before target location server 426 can send a location request for UE 110 to target serving node 424. Target serving node 424 may then update target location server 426 regarding this subsequent handover.

Figure 5:
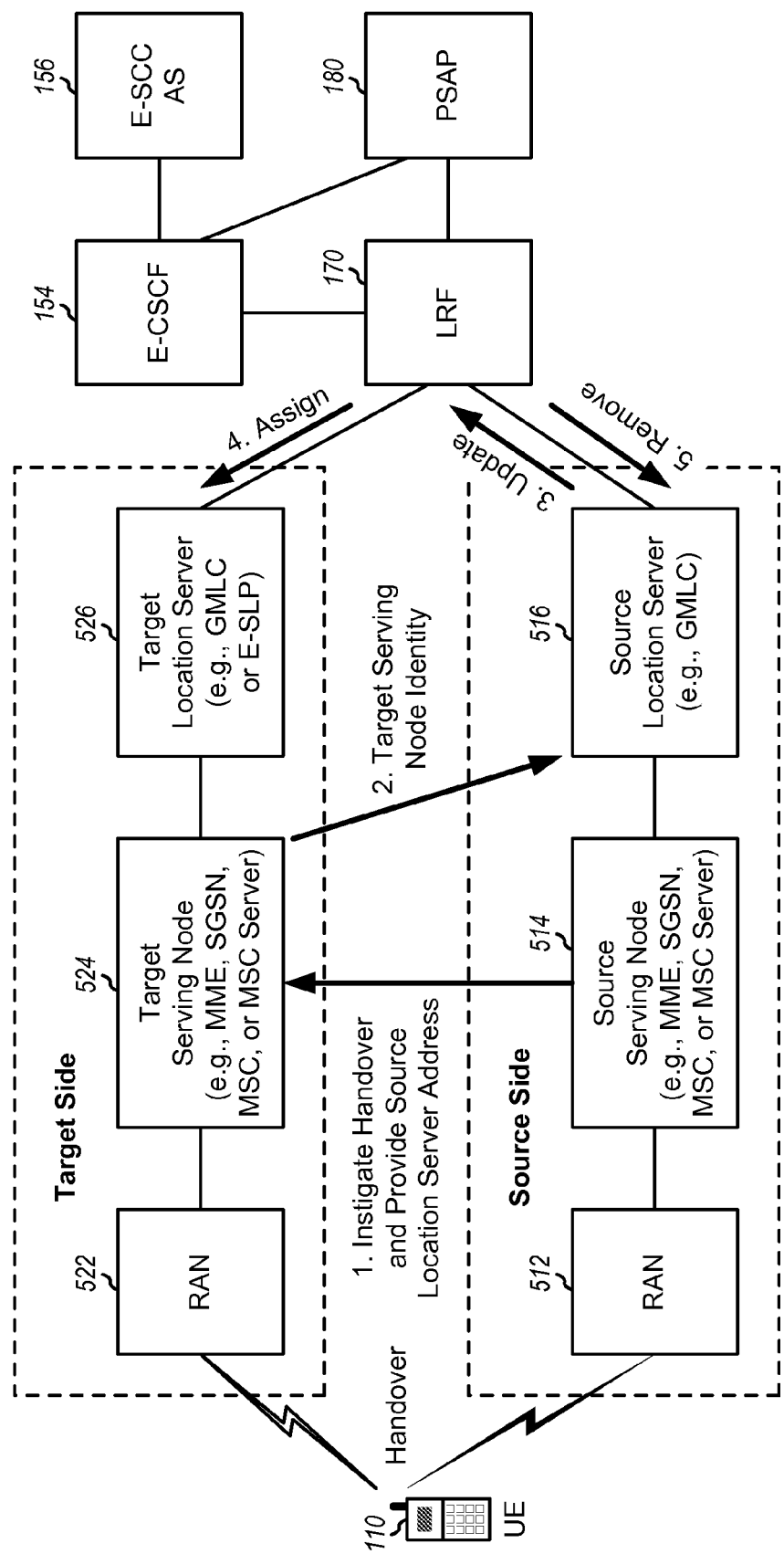

FIG. 5 shows a design of a third scheme for maintaining location continuity for UE 110 following handover, e.g., of an emergency call. The third scheme may be used for handovers between 3GPP RATs in handover scenarios in which (i) a control plane location solution is used on the source side and (ii) a control plane or a user plane solution is used on the target side. As shown in FIG. 5, UE 110 may communicate with a first RAN 512 and may be served by a source serving node 514 and a source location server 516 prior to handover. UE 110 may communicate with a second RAN 522 and may be served by a target serving node 524 and a target location server 526 after handover. Source serving node 514 may be MME 142, or SGSN 136, or MSC 132, or MSC server 134. Target serving node 524 may be MME 142, or SGSN 136, or MSC 132, or MSC server 134. Source location server 516 may be GMLC 138 or GMLC 148 for control plane location solution. Target location server 526 may be (i) GMLC 138 or GMLC 148 for control plane location solution or (ii) E-SLP 158 for user plane location solution.

For the third scheme, source serving node 514 may transfer the identity of source location server 516 to target serving node 524 when handover starts (step 1). This transfer may occur in the first message sent by source serving node 514 to target serving node 524. This message may be (i) a GPRS Tunneling Protocol (GTP) Forward Relocation Request message for a 3GPP PS-to-PS handover, or (ii) a SRVCC PS-to-CS Request message for an E-UTRAN to UTRAN/GERAN SRVCC handover, or (iii) some other message.

Target serving node 524 may then transfer its identity and the identity of UE 110 to source location server 516 (based on the source location server identity received in step 1) after handover is complete (step 2). This transfer may be achieved with a MAP SLR message if target serving node 524 is SGSN 136 or MSC server 134 or some other message if target serving node 524 is MME 142.

If source location server 516 maintains call records and can determine that it will be the target location server, then the subsequent steps may be skipped. Otherwise, source location server 516 may update LRF 170 with information on the handover, e.g., provide the UE identity and the target serving node identity (step 3). LRF 170 may determine target location server 526. If target location server 526 is different from source location server 516, then LRF 170 may provide target location server 526 with information about UE 110 and target serving node 524 (step 4). LRF 170 may then remove source location server 516 if it is different from target location server 526 (step 5).

Figure 6:
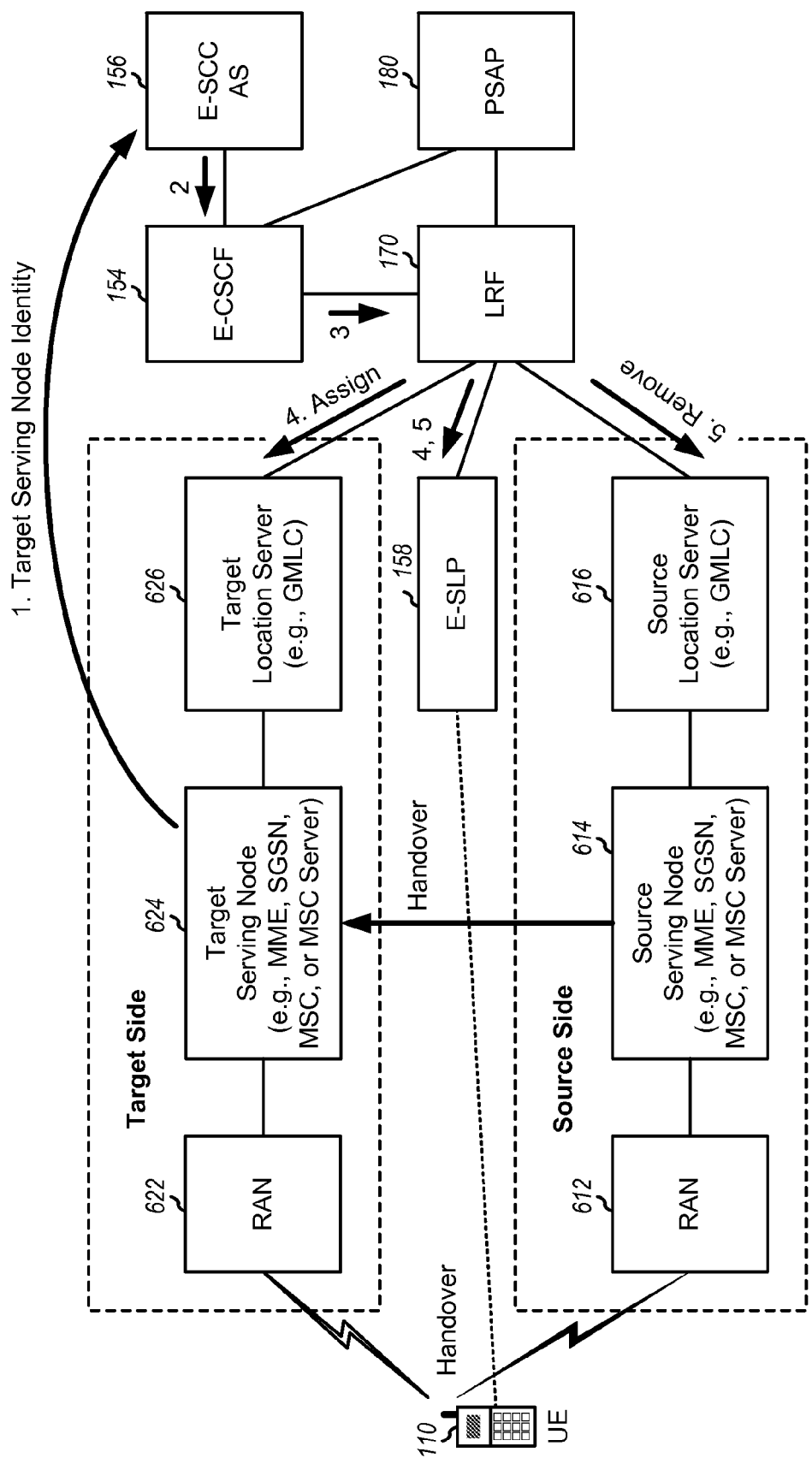

FIG. 6 shows a design of a fourth scheme for maintaining location continuity for UE 110 following handover, e.g., of an emergency call. The fourth scheme may be used for handovers between a 3GPP PS RAT and a 3GPP CS RAT when SRVCC support is provided by an E-SCC AS (e.g., E-SCC AS 156). A control plane location solution may be used on the CS side and either a control plane location solution or a user plane location solution may be used on the PS side. As shown in FIG. 6, UE 110 may communicate with a first RAN 612 and may be served by a source serving node 614 and a source location server 616 prior to handover. UE 110 may communicate with a second RAN 622 and may be served by a target serving node 624 and a target location server 626 after handover. Source serving node 614 may be MME 142, or SGSN 136, or MSC 132, or MSC server 134. Target serving node 624 may be MME 142, or SGSN 136, or MSC 132, or MSC server 134. Source location server 616 may be GMLC 138 or GMLC 148 for control plane location solution. Target location server 626 may be GMLC 138 or GMLC 148 for control plane location solution. Either source location server 616 or target location server 626 may be E-SLP 158 for user plane location solution.

For the fourth scheme, target serving node 624 may send a message to E-SCC AS 156 as part of a SRVCC handover procedure (defined in TS 23.216 and TS 23.237) to transfer a radio connection from the source RAN to the target RAN (step 1). This message may be a SIP INVITE message or an ISDN User Part Initial Address Message (ISUP IAM) message sent via a MGCF. Target serving node 624 may include its identity in this message. If the message is an ISUP IAM, then an existing ESRK or ESRD parameter in the ISUP IAM may be used to carry the target serving node identity for networks in North America. E-SCC AS 156 may then send a SIP INVITE message including the target serving node identity to E-CSCF 154 to update the remote leg of the emergency call (step 2). E-CSCF 154 may receive the identity of target serving node 624 and may provide this identity to LRF 170 (step 3). LRF 170 may determine and update target location server 626 with information for UE 110 and target serving node 624 (step 4). LRF 170 may also remove source location server 616 if it is different from target location server 626 (step 5).

FIGS. 3 through 6 show four exemplary schemes in which location continuity may be maintained for UE 110 by transferring the identity of the target serving node to the source or target location server. In the first scheme, the target serving node may send its identity to the target location server. In the second scheme, the source serving node may send the target serving node identity to the source location server. In the third scheme, the target serving node may send its identity to the source location server. In the fourth scheme, the target serving node may send its identity to the E-SCC AS, and the target serving node identity may be forwarded to the target location server. Other schemes for transferring the target serving node identity to the source or target location server (either directly or indirectly) may also be implemented. For all schemes, the target serving node identity may be used to establish a location session between LRF 170 and UE 110 to maintain location continuity for UE 110.

Figure 7:
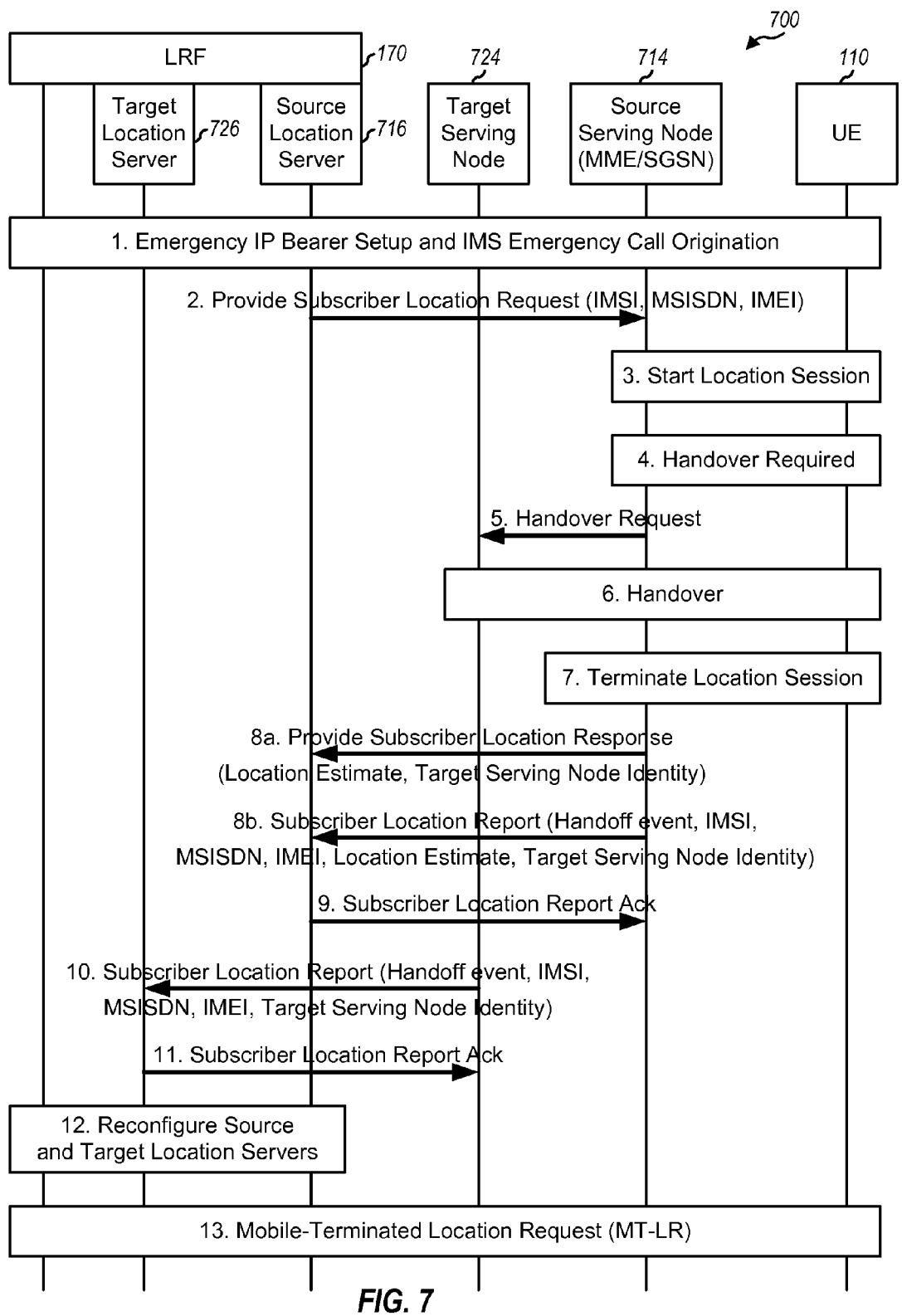
FIG. 7 illustrates a message flow for maintaining location continuity for a UE.

FIG. 7 shows a design of a message flow 700 for maintaining location continuity for UE 110 following handover. Message flow 700 may be used for various types of call. However, the description below assumes that UE 110 has an emergency call.

UE 110 may receive a request to originate an emergency call and may establish an emergency connection (step 1). The emergency connection may be (i) an emergency PDN connection for E-UTRAN access as described in TS 23.401, or (ii) an emergency PDP context for UTRAN PS access as described in TS 23.060, or (iii) some other type of connection. UE 110 may then establish an IMS emergency call as described in TS 23.167 (also step 1). During emergency call establishment, LRF 170 may be assigned to serve the emergency call, and a location server 716 (e.g., GMLC 138 or 148) may be chosen for UE 110.

At a later time, a serving node 714 (e.g., MME 142 or SGSN 136) may receive a request from location server 716 for the location of UE 110 (step 2). This request may include an identity of UE 110, which may be an International Mobile Subscriber Identity (IMSI), or a Mobile Station International Subscriber Directory Number (MSISDN), or an International Mobile Equipment Identity (IMEI). If the request in step 2 is received by serving node 714 or if support for a Network Initiated Location Request (NI-LR) location procedure is required, then serving node 714 may start a location session (e.g., with a serving RNC or an E-SMLC) to obtain the location of UE 110 (step 3).

Serving node 714 may receive a request for handover of UE 110 from a source RAN currently serving UE 110 to a target RAN (step 4). UE 110 may be handed over from a serving eNB in an E-UTRAN, or a serving RNC in a UTRAN, or some other network entity in some other RAN. UE 110 may be handed over to a target eNB for handover to E-UTRAN, or a target RNC for handover to UTRAN PS, or a target MSC server for handover to UTRAN CS or GERAN CS, or a target cell associated with a 1×RTT MSC for handover to 1×RTT, or a target cell for handover to HRPD. For the handover, serving node 714 may be referred to as the source serving node, and location server 716 may be referred to as the source location server. For handover to E-UTRAN, UTRAN PS, UTRAN CS, or GERAN CS, source serving node 714 may send a Handover Request message to a target serving node 724 as described in TS 23.401, TS 23.060, or TS 23.216 (step 5). For handover from E-UTRAN to 1×RTT, source serving node 714 may send a Handover Request message to a target 1×RTT IWS a described in TS 23.216. For handover from E-UTRAN to HRPD, step 5 may be skipped. A handover preparation and execution procedure may be performed as described in TS 23.401, TS 23.402, TS 23.060, or TS 23.216 (step 6).

The location session started in step 3 may terminate normally before step 6 is complete. If the location session is not terminated before step 6, then source serving node 714 may abort the location session after completing step 6 (step 7). This may lead to a location estimate for UE 110 being provided to source serving node 714.

If step 2 occurred, then source serving node 714 may return a Provide Subscriber Location Response message to source location server 716 (step 8*a*). This message may include a location estimate for UE 110 and the identity of target serving node 724. Whether or not the target serving node identity is included in the message may be decided based on configuration information at source serving node 714. This configuration information may include the source and target serving node identities, the location capabilities of a UE (e.g., UE 110), whether or not the UE is roaming, etc.

If steps 2 and 8*a* did not occur, then source serving node 714 may send to source location server 716 a Subscriber Location Report message that may include the identity of UE 110, the identity of target serving node 724, an event type indicating handover, a location estimate for UE 110, etc. (step 8*b*). Whether or not step 8*b* occurs may be dependent on configuration information at source serving node 714. Source location server 716 may acknowledge the Subscriber Location Report message if it is received from source serving node 714 (step 9).

After the handover in step 6 is complete, target serving node 724 may send to a target location server 726 (e.g., GMLC 138 or 148) a Subscriber Location Report message that may include the identity of UE 110, the identity of target serving node 724, an event type indicating handover, etc. (step 10). Target serving node 724 may determine the address of target location server 726 from its configuration information. Whether or not step 10 occurs may be decided by target serving node 724 based on configuration information at target serving node 724. This configuration information may include the source and target serving node identities, the location capabilities of a UE (e.g., UE 110), whether or not the UE is roaming, etc. For efficiency and reliability, the configuration information, if used at source serving node 714 and target serving node 724, should ensure that step 10 does not occur if step 8a or step 8b occurred, and vice versa. Target location server 726 may acknowledge the Subscriber Location Report message from target serving node 724 (step 11).

Reconfiguration of LRF 170, source location server 716, and target location server 726 may occur as described below in Table 5 (step 12). The reconfiguration may include removal of source location server 716, assignment of target location server 726, and updating of information in LRF 170, source location server 716, and/or target location server 726.

Subsequently, if LRF 170 needs a location estimate for UE 110 after handover has occurred, then LRF 170 may instigate a MT-LR location procedure via target location server 726 (step 13). This may involve repetition of step 2 on the target side. Steps 2 to 12 may also be repeated on the target side to support another handover for UE 110 if the previous handover was to either E-UTRAN or UTRAN PS.

Table 5 lists the actions performed by various network entities to maintain location continuity for UE 110 in different handover scenarios. In Table 5, the first column gives the access type and the location solution used on the source side. The second column gives the access type and the location solution used on the target side. The third column lists the actions performed by various network entities for each handover scenario. For all handover scenarios shown in Table 5, the LRF that was originally assigned to the emergency call may be retained after handover in order to avoid impact to the PSAP. However, other location server changes (e.g., addition or removal of a GMLC) may occur following handover, as described in Table 5.

TABLE 5

Location Reconfiguration Actions for Location Continuity

| Source Access Type & Location Solution | Target Access Type & Location Solution | Reconfiguration Actions |
| --- | --- | --- |
| E-UTRAN, UTRAN PS TS 23.271 | E-UTRAN, UTRAN PS TS 23.271 | Either (a) source serving node (e.g., SGSN or MME) transfers target serving node identity to source location server (e.g., GMLC) OR (b) target serving node (e.g., SGSN or MME) transfers its identity to target location server (e.g., GMLC). Source or target location server updates LRF. LRF replaces source location server with target location server if different from source location server. |
| E-UTRAN, UTRAN PS TS 23.271 | E-UTRAN, UTRAN PS SUPL (note 1) | Source serving node (e.g., SGSN or MME) transfers target serving node identity to source location server (e.g., GMLC). Source location server updates LRF. LRF replaces source location server with target location server (e.g., E-SLP). LRF transfers UE identity (e.g., IP address) to target location server. |
| E-UTRAN, UTRAN PS SUPL | E-UTRAN, UTRAN PS TS 23.271 (note 1) | Target serving node (e.g., SGSN or MME) transfers its identity to target location server (e.g., GMLC). Target location server updates LRF. LRF replaces source location server (e.g., E-SLP) with target location server. |
| E-UTRAN TS 23.271 | HRPD SUPL | Source serving node (e.g., MME) transfers HRPD related identity (e.g., cell ID) to source location server (e.g., GMLC). Source location server updates LRF. LRF replaces source location server with target location server (e.g., E-SLP). LRF transfers UE identity (e.g., IP address) to target location server. |
| E-UTRAN, UTRAN PS TS 23.271 | UTRAN CS, GERAN CS TS 23.271 | Either (a) source serving node (e.g., SGSN or MME) transfers identity of target serving node (e.g., SRVCC MSC) to source location server (e.g., GMLC) OR (b) target serving node transfers its identity to target location server (e.g., GMLC). Source or target location server updates LRF. LRF replaces source location server with target location server if different from source location server. |
| E-UTRAN, UTRAN PS SUPL | UTRAN CS, GERAN CS TS 23.271 | Target serving node (e.g., SRVCC MSC) transfers its identity to target location server (e.g., GMLC). Target location server updates LRF. LRF replaces source location server (e.g., E-SLP) with target location server. |

TABLE 5-continued

Location Reconfiguration Actions for Location Continuity

| Source Access Type & Location Solution | Target Access Type & Location Solution | Reconfiguration Actions |
|---|---|---|
| E-UTRAN TS 23.271 | 1xRTT J-STD-036B | Either (a) source serving node (e.g., MME) transfers identity of target serving node (e.g., 1xRTT MSC) to source location server (e.g., GMLC) OR (b) a target side update occurs. Source location server or target side updates LRF. LRF replaces source location server with location support on target side. |
| E-UTRAN SUPL | 1xRTT J-STD-036B | Target side updates LRF. LRF replaces source location server (e.g., E-SLP) with location support on target side. |

(note 1): location solution may be changed for an intra E-UTRAN handover, an intra UTRAN PS handover, and an inter-RAT handover.

For the first handover scenario in Table 5, the transfer by the source serving node in step (a) may be performed in step 8a or 8b in message flow 700 in FIG. 7. The transfer by the target serving node in step (b) may be performed in step 10 in message flow 700. The update of the LRF and the replacement of the source location server may be performed in step 12 in message flow 700. A similar mapping between the steps in Table 5 and the steps in message flow 700 may apply to the other handover scenarios in Table 5.

As shown in Table 5, message flow 700 may be used for handover between RANs of different RATs. Message flow 700 may also be used for handover between RANs of the same RAT, e.g., for handover from E-UTRAN to E-UTRAN, or from UTRAN PS to UTRAN PS, etc. Handover between RANs of the same RAT may mean change of base station and possibly other network entity (e.g., RNC) and change of serving node (e.g., MME or SGSN) but with the type of each network entity remaining the same.

If handover occurs to HRPD, then SUPL may be used on the target side. In that case, a source side update may be performed if the control plane location solution was used on the source side.

E-SLP 158 may not be able to receive the target serving node identity. E-SLP 158 may be assigned and removed by LRF 170 based on updates to other location servers.

Handover of an IP bearer for an established or not yet established IMS emergency call may occur within the PS domain, e.g., intra E-UTRAN, intra UTRAN, E-UTRAN to UTRAN, UTRAN to E-UTRAN, or E-UTRAN to HRPD. Handover of an already established IMS emergency call may also occur from the PS domain to the CS domain using SRVCC as described in TS 23.216. When such an event occurs in a context where location support for the emergency call is required on the source side, continuity of location services may be required on the target side. In this case, the location solution employed on the source and target sides may stay the same or may change. In addition, some reconfiguration of the associated location server(s) (e.g., GMLC, LRF, E-SLP) may be performed regardless of whether or not the location solution changes.

Much of the description above assumes a case in which a network operator employs one LRF to support emergency calls. A network operator may employ multiple LRFs to interface with different groups of PSAPs in different geographical regions and/or to support load sharing. Location continuity may be maintained even when multiple LRFs are present without impacting network entities (e.g., MME, SGSN, MSC, and GMLC) in the core networks, except for the LRFs.

In one design, a central entity may maintain the identity of the current serving node for each UE having a connection (e.g., an emergency IP connection) and for which control plane location solution may be needed. The central entity may be physically part of a LRF or may be separate from a LRF. The central entity may be referred to as a Central Location Register (CLR) and may support location continuity for UEs when one or multiple LRFs are present.

Figure 8:
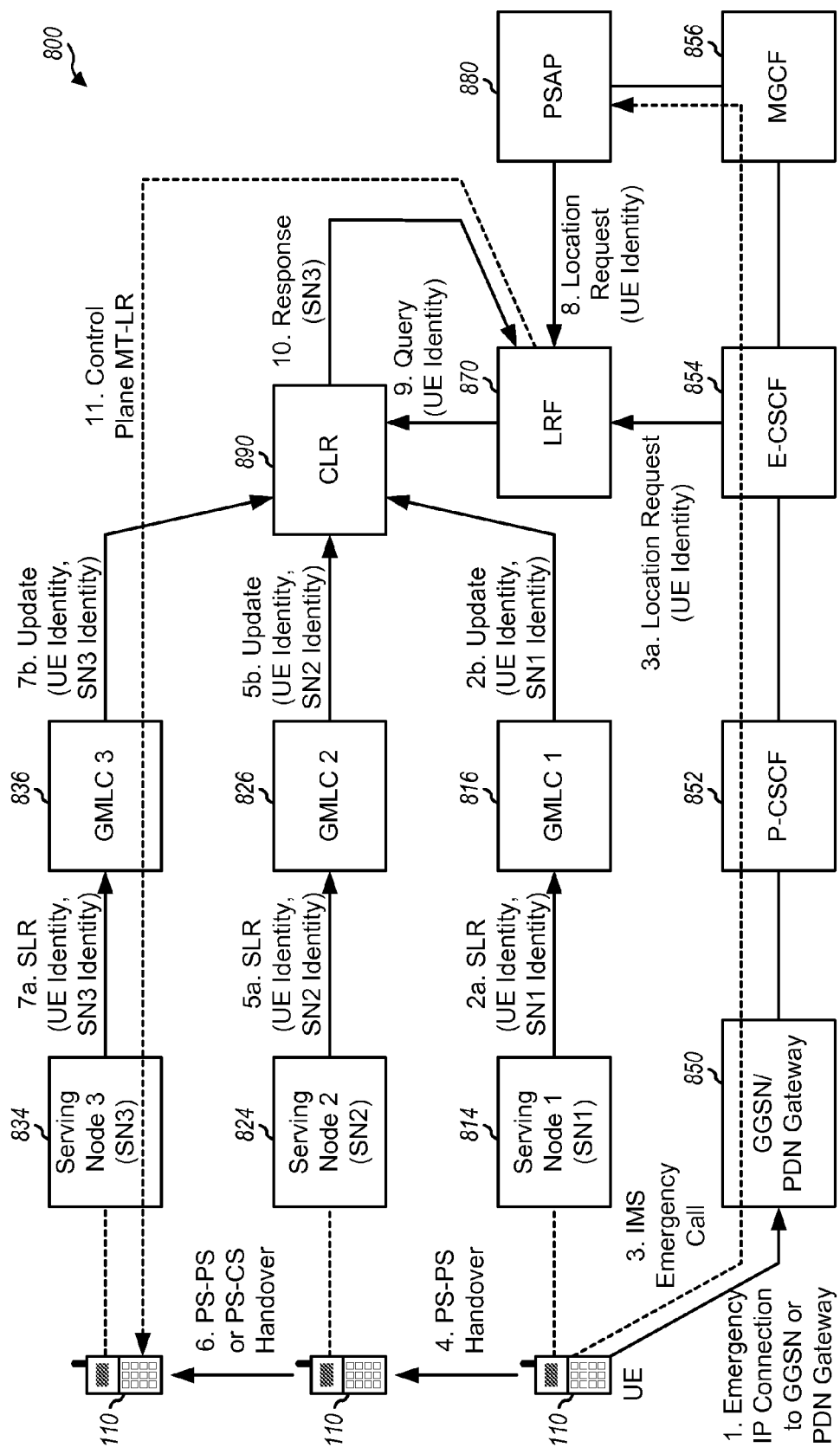
FIG. 8 illustrates an exemplary handover scenario for a UE.

FIG. 8 shows an exemplary scenario 800 in which UE 110 is involved in multiple handovers with control plane location solution being used for each serving node. UE 110 may establish an emergency IP connection (e.g., an emergency PDP context or an emergency PDN connection) via a PDN gateway or GGSN 850 (step 1). During IP connection establishment, a serving node 814 (e.g., a MME or a SGSN) for UE 110 may invoke an NI-LR location procedure for UTRAN/GERAN access or E-UTRAN access, which may cause an update of the identities of serving node 814 and UE 110 to be transferred in a MAP SLR message to a location server 816 (e.g., a GMLC) (step 2a). Location server 816 may then transfer the update to a CLR 890, e.g., in similar manner as an update to a LRF (step 2b).

In one design, an E-CSCF 854 may select a LRF 870 from among all available LRFs based on the current serving cell or the current UE location (if known to E-CSCF 854) and may assign LRF 870 to the IMS emergency call for UE 110. This design may enable LRFs to be confined to serving particular regions of a wireless network. In another design, E-CSCF 854 may dynamically assign a LRF with no fixed association to the serving node (e.g., a MME or a SGSN). This design may enable the available LRFs to share the load in the wireless network. In any case, UE 110 may communicate with a PSAP 880 via PDN gateway/GGSN 850, a P-CSCF 852, E-CSCF 854, and a MGCF 856 for the IMS emergency call (step 3).

UE 110 may be handed over from serving node 814 to a new serving node 824 (e.g., a MME, a SGSN, or a MSC server) (step 4). Message flow 700 in FIG. 7 may be used to transfer an update of the identities of serving node 824 and UE 110 to location server 816 on the source side (not shown in FIG. 8) or to a location server 826 (e.g., a GMLC) on the target side (step 5a). The location server that receives the update may forward it to CLR 890, which may then be informed about the current serving node for UE 110 (step 5b).

UE 110 may be handed over from serving node 824 to a new serving node 834 (step 6). Serving node 824 may transfer an update of the identities of serving node 834 and UE 110 to location server 826 on the source side (not shown in FIG. 8) or serving node 834 may transfer this information to a location server 836 (e.g., a GMLC) on the target side (step 7*a*). The location server that receives the update may forward it to CLR 890 (step 7*b*).

LRF 870 may be assigned by E-CSCF 854 for the IMS emergency call for UE 110. PSAP 880 may send a location request to LRF 870 whenever a location estimate for UE 110 is desired (step 8). LRF 870 may send a query with its identity and the UE identity to CLR 890 (step 9). CLR 890 may return the identity of the most current serving node for UE 110 if there is one (step 10). CLR 890 may store the identity of LRF 870. CLR 890 may also forward to LRF 870 any further update of the serving node identity for UE 110 that may subsequently be received from location servers due to handover of either the emergency IP connection or the emergency call to a new serving node. This automatic update by CLR 890 may avoid the need for LRF 870 to sent queries to CLR 890 for location requests. LRF 870 may inform CLR 890 when the call has been released, and CLR 890 may then stop forwarding serving node updates to LRF 870. LRF 870 may perform a MT-LR location procedure for UE 110 via location server 836 and, if a control plane solution is used, via serving node 834 to obtain a location estimate for UE 110 (step 11).

The scheme shown in FIG. 8 may ensure that a LRF supporting an IMS emergency call always has the identity of the most current serving node for a UE. This information may be handy whenever a control plane location solution needs to be used for this serving node. The scheme may also ensure that the LRF will become aware of any handoff from a serving node associated with the control plane location solution to a serving node for which only a user plane location solution is used (since there may be an update on the source side for such a handover). The LRF may then make use of the user plane location solution for the UE until updated by the CLR with a new serving node for which a control plane location solution may be used. If the initial serving node for the UE (i.e., the serving node that first provides the emergency IP connection) only supports a user plane location solution, then the NI-LR location procedure may not be invoked by the serving node (e.g., a SGSN or a MME), and hence the CLR and the LRF may not be updated. However, in this case, the LRF can determine the need for a user plane location solution from the access type associated with the serving cell and can continue to use this information until updated by the CLR with the identity of a serving node (e.g., a SRVCC MSC server) for which a control plane location solution may or must be used.

Figure 9:
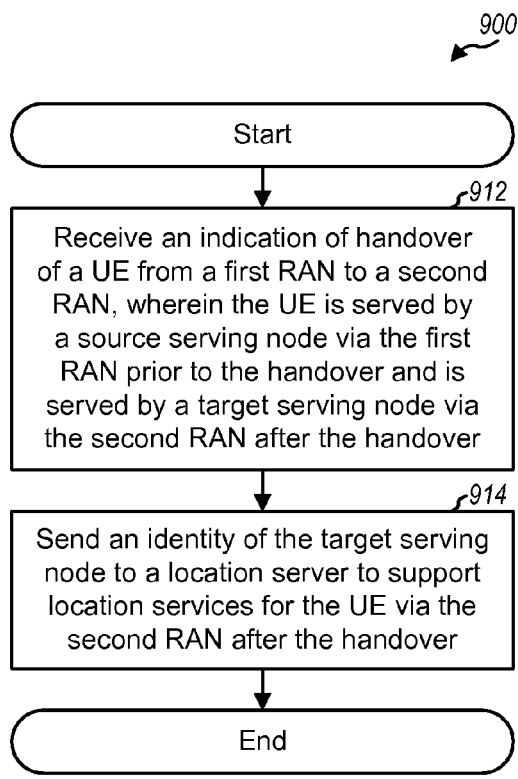
FIG. 9 illustrates a process for supporting location services by a serving node.

FIG. 9 shows a design of a process 900 for supporting location services by a serving node. The serving node may receive an indication of handover of a UE from a first RAN to a second RAN (block 912). The UE may be served by a source serving node via the first RAN prior to the handover and may be served by a target serving node via the second RAN after the handover. The serving node may send an identity of the target serving node to a location server to support location services for the UE via the second RAN after the handover (block 914).

The first RAN may support a first RAT, and the second RAN may support a second RAT. In one design, the first RAT may be different from the second RAT. In another design, the first RAT may be the same as the second RAT.

The UE may have an emergency call or some other type of call when the handover occurs. In one design, the first and second RANs may support PS calls, and the UE may perform PS-to-PS handover. In another design, the first RAN may support PS calls, the second RAN may support CS calls, and the UE may perform PS-to-CS handover. In yet another design, the first RAN may support CS calls, the second RAN may support PS calls, and the UE performs CS-to-PS handover. In yet another design, the first and second RANs may support CS calls, and the UE may perform CS-to-CS handover.

In one design, the serving node may be the target serving node, and the location server may be a target location server supporting location services for the UE after the handover. The target serving node may determine the target location server based on configuration information stored at the target serving node or a DNS query. In another design, the serving node may be the source serving node, and the location server may be a source location server supporting location services for the UE prior to the handover.

The target serving node may be dependent on the second RAN and the access type. For example, the target serving node may be a MME for E-UTRAN, a SGSN for UTRAN PS, a MSC for GERAN or 1×RTT, a MSC server for UTRAN CS or GERAN, or some other network entity. The location server may be a GMLC, a MPC, a LRF, or some other network entity. An E-SLP may serve as a location server for the source side or the target side but may be assigned and removed by a LRF based on updates received by the LRF from the location server.

Figure 10:
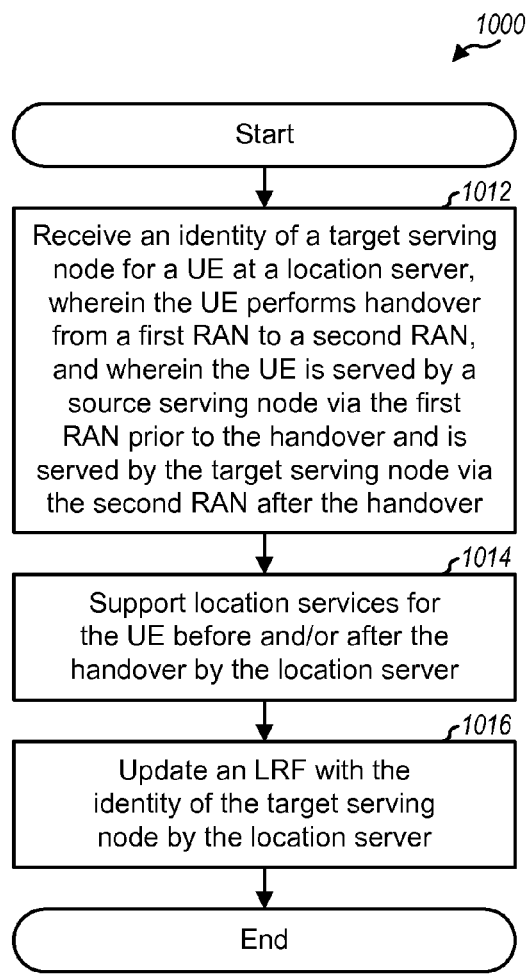
FIG. 10 illustrates a process for supporting location services by a location server.

FIG. 10 shows a design of a process 1000 for supporting location services by a location server. The location server may receive an identity of a target serving node for a UE performing handover from a first RAN to a second RAN (block 1012). The UE may be served by a source serving node via the first RAN prior to the handover and may be served by the target serving node via the second RAN after the handover, e.g., for an emergency call. The location server may support location services for the UE before the handover, or after the handover, or both (block 1014). The location server may update a LRF with the identity of the target serving node (block 1016).

In one design, the location server may be a target location server supporting location services for the UE after the handover. The target location server may receive the identity of the target serving node from the target serving node. In another design, the location server may be a source location server supporting location services for the UE before the handover. The source location server may receive the identity of the target serving node from the source serving node.

FIG. 11 shows a design of a process 1100 for supporting location services by a LRF. The LRF may receive an identity of a target serving node for a UE performing handover from a first RAN to a second RAN (block 1112). The UE may be served by a source serving node via the first RAN prior to the handover and may be served by the target serving node via the second RAN after the handover. The LRF may support an emergency call for the UE before and after the handover. The LRF may determine a target location server to support location services for the UE after the handover (block 1114). The LRF may determine the target location server based on the target serving node identity, configuration information stored at the LRF, and/or other information. The LRF may replace a source location server (which may support location services for the UE prior to the handover) with the target location server if the source location server is different from the target location server (block 1116). The LRF may thereafter initiate a location session for the UE based on the identity of the target serving node (block 1118).

In one design, the LRF may receive the identity of the target serving node from the target location server. In another design, the LRF may receive the identity of the target serving node from the source location server. In this design, the LRF may receive the identity of the UE from the source location server and may transfer the UE identity to the target location server.

FIG. 12 shows a design of a process 1200 for obtaining location services by a UE. The UE may perform handover from a first RAN to a second RAN (block 1212). The UE may be served by a source serving node via the first RAN prior to the handover and may be served by a target serving node via the second RAN after the handover. The UE may communicate with the first RAN prior to the handover and with the second RAN after the handover for an emergency call or some other type of call. An identity of the target serving node may be sent to a location server during the handover to support location services for the UE after the handover. The UE may obtain location services via the first RAN before the handover (block 1214). The UE may obtain location services via the second RAN after the handover (block 1216). The UE may engage in a location session initiated after the handover based on the identity of the target serving node (block 1218).

The UE may have an emergency call with a PSAP, and the call may be handed over from the first RAN to the second RAN. The UE may be involved in a location session to obtain a location estimate for the UE, e.g., before or after the handover. In this case, the UE may be deemed to have obtained location services, which may entail a transfer of the location estimate for the UE to the PSAP on behalf of the UE.

In one design, the UE may obtain location services via a control plane location solution (e.g., TS 23.271 or J-STD-036B) prior to the handover and via a control plane location solution after the handover. In another design, the UE may obtain location services via a control plane location solution prior to the handover and via a user plane location solution (e.g., SUPL) after the handover. In yet another design, the UE may obtain location services via a user plane location solution prior to the handover and via a control plane location solution after the handover.

Figure 13:
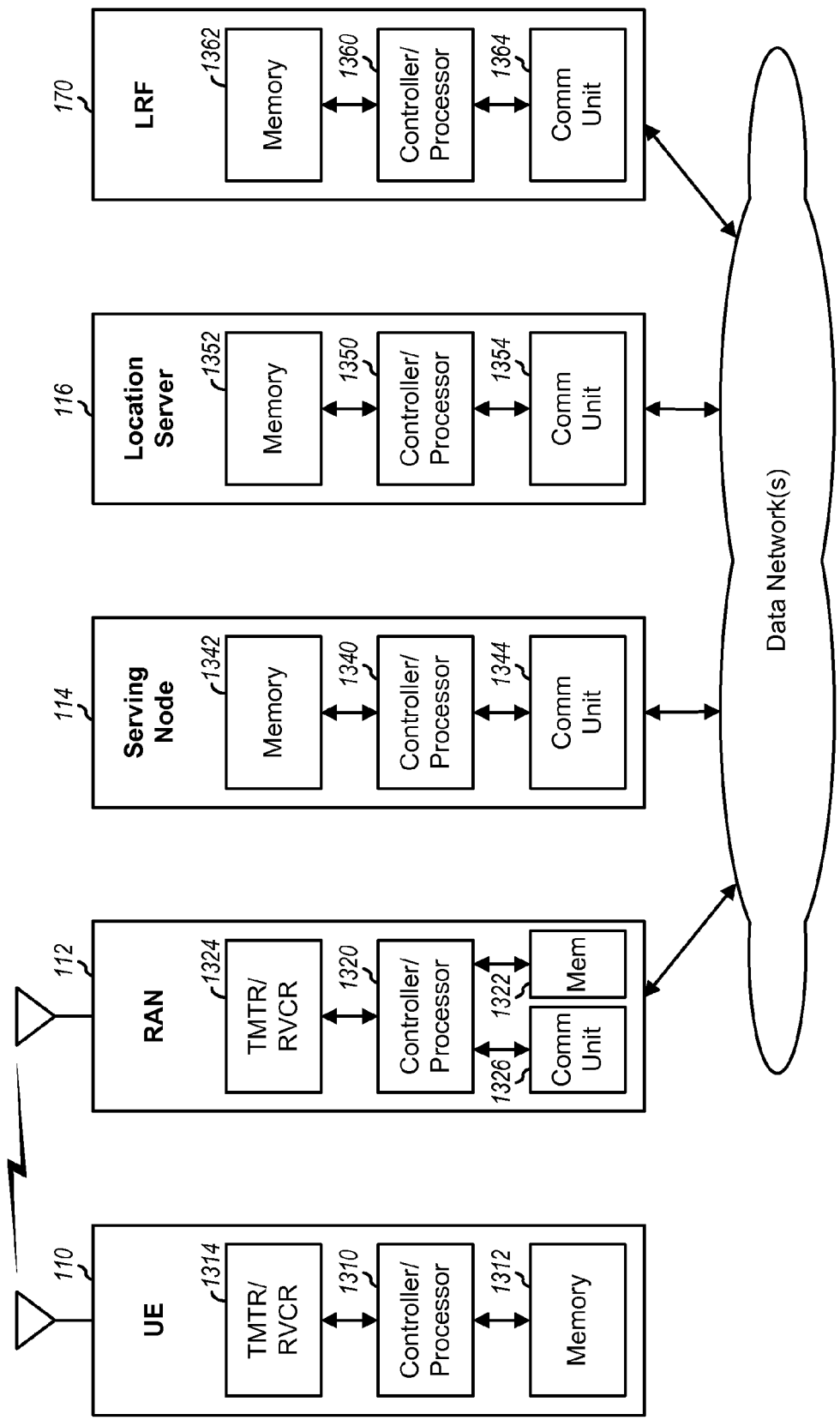
FIG. 13 illustrates a block diagram of the UE and various network entities.

FIG. 13 shows a block diagram of a design of UE 110, a RAN 112, a serving node 114, a location server 116, and LRF 170. RAN 112 may be a UTRAN, an E-UTRAN, a GERAN, a 1×RTT RAN, a HRPD RAN, or some other RAN. Serving node 114 may be a MME, a SGSN, a MSC, a MSC server, or some other network entity. Location server 116 may be a GMLC, a MPC, an E-SLP, or some other network entity. For simplicity, FIG. 13 shows (i) one controller/processor 1310, one memory 1312, and one transmitter/receiver (TMTR/RCVR) 1314 for UE 110, (ii) one controller/processor 1320, one memory 1322, one transmitter/receiver 1324, and one communication (Comm) unit 1326 for RAN 112, (iii) one controller/processor 1340, one memory 1342, and one communication unit 1344 for serving node 114, (iv) one controller/processor 1350, one memory 1352, and one communication unit 1354 for location server 116, and (v) one controller/processor 1360, one memory 1362, and one communication unit 1364 for LRF 170. In general, each entity may include any number of controllers, processors, memories, transceivers, communication units, etc.

On the downlink, base stations in RAN 112 may transmit traffic data, messages/signaling, and pilot to UEs within their coverage areas. These various types of data may be processed by processor 1320 and conditioned by transmitter 1324 to generate downlink signals, which may be transmitted to UEs. At UE 110, the downlink signals from base stations may be received and conditioned by receiver 1314 and further processed by processor 1310 to obtain various types of information for communication, location, and other services. Processor 1310 may perform process 1200 in FIG. 12. Memories 1312 and 1322 may store program codes and data for UE 110 and RAN 112, respectively. On the uplink, UE 110 may transmit traffic data, messages/signaling, and pilot to base stations in RAN 112. These various types of data may be processed by processor 1310 and conditioned by transmitter 1314 to generate an uplink signal, which may be transmitted to RAN 112. At RAN 112, the uplink signals from UE 110 and other UEs may be received and conditioned by receiver 1324 and further processed by processor 1320 to obtain various types of information sent by the UEs. RAN 112 may communicate with other network entities via communication unit 1326.

Within serving node 114, processor 1340 may perform various functions to support communication and other services for UE 110. Memory 1342 may store program codes and data for serving node 114. Communication unit 1344 may enable serving node 114 to communicate with other network entities. Processor 1340 may perform process 900 in FIG. 9. Within location server 116, processor 1350 may perform location and/or positioning processing for location server 116. Memory 1352 may store program codes and data for location server 116. Communication unit 1354 may enable location server 116 to communicate with other entities. Processor 1350 may perform process 1000 in FIG. 10. Within LRF 170, processor 1360 may perform processing to support routing and location for UEs. Memory 1362 may store program codes and data for LRF 170. Communication unit 1364 may enable LRF 170 to communicate with other network entities. Processor 1360 may perform process 1100 in FIG. 11.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a UE refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "user equipment" is also intended to include devices which communicate with a personal navigation device (PND), such as by short-range wireless, infrared, wireline connection, or other connection— regardless of whether satellite signal reception, assistance data reception, and/or position-related processing occurs at the device or at the PND. Also, "user equipment" is intended to include all devices, including wireless communication devices, computers, laptops, etc. which are capable of communication with a server, such as via the Internet, Wi-Fi, femtocells, or other network, and regardless of whether satellite signal reception, assistance data reception, and/or position-related processing occurs at the device, at a server, or at another device associated with the network. Any operable combination of the above are also considered a "user equipment".

The methodologies/implementations described herein may be implemented by various means depending upon the application. For example, they may be implemented in hardware, firmware, software, or any combination thereof. For an implementation involving hardware, the processors may be implemented with one or more application specific integrated circuits (ASICs), digital signal processors (DSPs), digital signal processing devices (DSPDs), programmable logic devices (PLDs), field programmable gate arrays (FPGAs), general purpose processors, controllers, micro-controllers, microprocessors, state machines, electronic devices, other electronic units designed to perform the functions described herein, or a combination thereof, for example, one or more microprocessors in conjunction with a DSP core, a plurality of microprocessors, or any other suitable configuration.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, firmware/software codes may be stored in a memory and executed by a processor/computer to cause the processor/computer to perform functions. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of a computer program product. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of receiving location services, the method comprising:
   communicating, by a user equipment (UE), with a first radio access network (RAN) prior to a handover;
   receiving, by the UE via the first RAN prior to the handover, information for the location services from a source location server;
   communicating, by the UE with a second RAN after the handover; and
   receiving, by the UE via the second RAN after the handover, information for the location services from a target location server, the target location server being different from the source location server.

2. The method of claim 1 further comprising:
   providing, by the UE after the handover, handover related measurements indicative of a target serving node identity to the second RAN.

3. The method of claim 1, further comprising:
   receiving, at the UE, the information for the location services from the source location server via a user plane location solution prior to the handover; and
   receiving, at the UE, the information for the location services from the target location server via a control plane location solution after the handover.

4. The method of claim 1, further comprising:
   receiving, at the UE, the information for the location services from the source location server via a control plane location solution prior to the handover; and
   receiving, at the UE, the information for the location services from the target location server via a user plane location solution after the handover.

5. The method of claim 1, further comprising:
   communicating, by the UE, with the first RAN prior to the handover and with the second RAN after the handover for an emergency call.

6. An apparatus for receiving location services, the apparatus comprising:
   memory;
   at least one processor coupled to the memory; and
   a transceiver configured to:
      communicate with a first radio access network (RAN) prior to a handover;
      receive, via the first RAN prior to the handover, information for the location services from a source location server;
      communicate, with a second RAN after the handover; and
      receive, via the second RAN after the handover, information for the location services from a target location server, the target location server being different from the source location server.

7. The apparatus of claim 6 wherein the transceiver is further configured to provide, after the handover, handover related measurements indicative of a target serving node identity to the second RAN.

8. The apparatus of claim 6 wherein the transceiver is further configured to:
   receive the information for the location services from the source location server via a user plane location solution prior to the handover; and
   receive the information for the location services from the target location server via a control plane location solution after the handover.

9. The apparatus of claim 6 wherein the transceiver is further configured to:
   receive the information for the location services from the source location server via a control plane location solution prior to the handover; and
   receive the information for the location services from the target location server via a user plane location solution after the handover.

10. The apparatus of claim 6 wherein the transceiver is further configured to communicate with the first RAN prior to the handover and with the second RAN after the handover for an emergency call.

11. An apparatus for receiving location services, the apparatus comprising:
    means for communicating with a first radio access network (RAN) prior to a handover;
    means for receiving, via the first RAN prior to the handover, information for the location services from a source location server;
    means for communicating with a second RAN after the handover; and
    means for receiving, via the second RAN after the handover, information for the location services from a target location server, the target location server being different from the source location server.

12. The apparatus of claim 11 further comprising:
    means for providing, after the handover, handover related measurements indicative of a target serving node identity to the second RAN.

13. The apparatus of claim 11, further comprising:
    means for receiving the information for the location services from the source location server via a user plane location solution prior to the handover; and
    means for receiving the information for the location services from the target location server via a control plane location solution after the handover.

14. The apparatus of claim 11, further comprising:
    means for receiving the information for the location services from the source location server via a control plane location solution prior to the handover; and
    means for receiving the information for the location services from the target location server via a user plane location solution after the handover.

15. A non-transitory processor-readable medium, having stored thereon processor-readable instructions configured to cause a processor to:
    communicate with a first radio access network (RAN) prior to a handover;
    receive, via the first RAN prior to the handover, information for location services from a source location server;
    communicate, with a second RAN after the handover; and
    receive, via the second RAN after the handover, information for the location services from a target location server, the target location server being different from the source location server.

16. A method of supporting location services for a user equipment (UE) after handover, the method comprising:
supporting communications for the UE prior to a handover;
receiving, by a location and routing function (LRF), an identity of a target serving node;
determining, by the LRF based at least in part on the identity of the target serving node, a target location server for supporting the location services for the UE after the handover; and
updating information at the LRF to replace a source location server for supporting the location services for the UE prior to the handover with the target location server for supporting the location services for the UE after the handover, the target location server being different from the source location server.

17. The method of claim 16 further comprising initiating a location session for the UE after the handover based on the identity of the target serving node.

18. The method of claim 16 further comprising receiving the identity of the target serving node, at the LRF, from the target location server.

19. The method of claim 16 further comprising receiving the identity of the target serving node, at the LRF, from the source location server.

20. The method of claim 19 further comprising:
receiving an identity of the UE, at the LRF, from the source location server; and
sending the identity of the UE, by the LRF, to the target location server.

21. The method of claim 16 further comprising determining the target location server based on configuration information stored at the LRF.

22. The method of claim 16 wherein the LRF consists of only one LRF.

23. The method of claim 16 wherein the LRF comprises a plurality of LRFs.

24. A location and routing function (LRF) for supporting location services for a user equipment (UE), the LRF comprising:
memory;
a communications unit configured to:
support communications for the UE prior to a handover;
receive an identity of a target serving node; and
at least one processor coupled to the memory and configured to:
determine, based at least in part on the identity of the target serving node, a target location server for supporting the location services for the UE after the handover; and
update information at the LRF to replace a source location server for supporting the location services for the UE prior to the handover with the target location server for supporting the location services for the UE after the handover, the target location server being different from the source location server.

25. The LRF of claim 24, the at least one processor further configured to initiate a location session for the UE after the handover based on the identity of the target serving node.

26. The LRF of claim 24, the communications unit further configured to receive the identity of the target serving node from the target location server.

27. The LRF of claim 24, the communications unit further configured to receive the identity of the target serving node from the source location server.

28. The LRF of claim 27, the communications unit further configured to:
receive an identity of the UE from the source location server; and
send the identity of the UE to the target location server.

29. The LRF of claim 24, the at least one processor further configured to determine the target location server based on configuration information stored at the LRF.

30. The LRF of claim 24 consisting of only one LRF.

31. The LRF of claim 24 comprising a plurality of LRFs.

32. The LRF of claim 24, the at least one processor further configured to support emergency call communications for the UE prior to the handover.

33. A location and routing function (LRF) for supporting location services for a user equipment (UE), the LRF comprising:
means for supporting communications for the UE prior to a handover;
means for receiving, by the location and routing function (LRF), an identity of a target serving node;
means for determining, by the LRF based at least in part on the identity of the target serving node, a target location server for supporting the location services for the UE after the handover; and
means for updating information at the LRF to replace a source location server for supporting the location services for the UE prior to the handover with the target location server for supporting the location services for the UE after the handover, the target location server being different from the source location server.

34. A non-transitory processor-readable medium, having stored thereon processor-readable instructions configured to cause a processor to:
support communications for the UE prior to a handover;
receive, by a location and routing function (LRF), an identity of a target serving node;
determine, by the LRF based at least in part on the identity of the target serving node, a target location server for supporting the location services for the UE after the handover; and
update information at the LRF to replace a source location server for supporting the location services for the UE prior to the handover with the target location server for supporting the location services for the UE after the handover, the target location server being different from the source location server.

* * * * *